United States Patent
Lemons

(10) Patent No.: US 7,880,076 B2
(45) Date of Patent: *Feb. 1, 2011

(54) CHILD DEVELOPMENT AND EDUCATION APPARATUS AND METHOD USING VISUAL STIMULATION

(75) Inventor: Kenneth R. Lemons, Indianapolis, IN (US)

(73) Assignee: Master Key, LLC, Indianapolis, IN (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/024,172

(22) Filed: Feb. 1, 2008

(65) Prior Publication Data

US 2008/0245211 A1    Oct. 9, 2008

Related U.S. Application Data

(60) Provisional application No. 60/912,242, filed on Apr. 17, 2007, provisional application No. 60/921,578, filed on Apr. 3, 2007.

(51) Int. Cl.
*G10H 7/00* (2006.01)

(52) U.S. Cl. .......................... 84/600; 84/609
(58) Field of Classification Search ........... 84/600–602, 84/609, 649
See application file for complete search history.

(56) References Cited

U.S. PATENT DOCUMENTS

| | | | | |
|---|---|---|---|---|
| 2,804,500 A * | 8/1957 | Giacoletto | ................ | 704/276 |
| 3,969,972 A * | 7/1976 | Bryant | ................ | 84/464 R |
| 4,128,846 A * | 12/1978 | Robinson, Jr. | ................ | 381/56 |
| 4,172,406 A * | 10/1979 | Martinez | ................ | 84/464 R |
| 4,257,062 A * | 3/1981 | Meredith | ................ | 84/464 R |
| 4,378,466 A * | 3/1983 | Esser | ................ | 345/22 |
| 4,526,168 A | 7/1985 | Hassler et al. | | |
| 4,887,507 A | 12/1989 | Shaw | | |
| 4,907,573 A | 3/1990 | Nagasaki | | |
| 5,048,390 A * | 9/1991 | Adachi et al. | ................ | 84/464 R |

(Continued)

FOREIGN PATENT DOCUMENTS

EP    0349686 A1    1/1990

(Continued)

OTHER PUBLICATIONS

"Time-line of the Music Animation Machine (and related experiments)", Music Animation Machine: History, htp://www.musanim.com/mam/mamhist.htm, pp. 1-5, p. 1, pp. 1-2, pp. 1-2 & p. 1, printed Aug. 30, 2007.

(Continued)

*Primary Examiner*—David S. Warren
(74) *Attorney, Agent, or Firm*—Woodard Emhardt Moriarty McNett & Henry LLP

(57) ABSTRACT

The present disclosure relates to child musical education devices and methods. Various toy instruments are provided which incorporate simplified forms of tonal and rhythmic music visualization. A child of very young age is able to select a certain 'mood' or feeling and hear music which corresponds to that mood. In addition, visual representations of the selected music can be displayed on the instrument. Recording and playback functionality is optionally provided, along with rhythm accompaniments and other adjustable audio features. Certain embodiments allow the various components to be interconnected to allow maximum flexibility and upgradeability.

11 Claims, 21 Drawing Sheets

U.S. PATENT DOCUMENTS

| | | | |
|---|---|---|---|
| 5,206,733 A | | 4/1993 | Holdredge |
| 5,207,214 A | | 5/1993 | Romano |
| 5,370,539 A | | 12/1994 | Dillard |
| 5,415,071 A | | 5/1995 | Davies |
| 5,563,358 A | * | 10/1996 | Zimmerman ............... 84/477 R |
| 5,741,990 A | | 4/1998 | Davies |
| 5,784,096 A | * | 7/1998 | Paist ........................... 348/32 |
| 6,031,172 A | | 2/2000 | Papadopoulos |
| 6,111,755 A | | 8/2000 | Park |
| 6,127,616 A | * | 10/2000 | Yu ............................. 84/483.2 |
| 6,137,041 A | | 10/2000 | Nakano |
| 6,201,769 B1 | | 3/2001 | Lewis |
| 6,245,981 B1 | | 6/2001 | Smith |
| 6,350,942 B1 | * | 2/2002 | Thomson ................... 84/477 R |
| 6,390,923 B1 | | 5/2002 | Yoshitomi et al. ............. 463/43 |
| 6,392,131 B2 | | 5/2002 | Boyer |
| 6,411,289 B1 | * | 6/2002 | Zimmerman ................ 715/243 |
| 6,448,487 B1 | | 9/2002 | Smith |
| 6,686,529 B2 | | 2/2004 | Kim |
| 6,750,386 B2 | | 6/2004 | King |
| 6,791,568 B2 | * | 9/2004 | Steinberg et al. ............. 345/600 |
| 6,841,724 B2 | * | 1/2005 | George ...................... 84/477 R |
| 6,856,329 B1 | * | 2/2005 | Peevers et al. ............... 715/722 |
| 6,927,331 B2 | | 8/2005 | Haase |
| 6,930,235 B2 | | 8/2005 | Sandborn et al. |
| 7,030,307 B2 | | 4/2006 | Wedel |
| 7,096,154 B1 | | 8/2006 | Andrade-Cetto |
| 7,153,139 B2 | | 12/2006 | Wen et al. |
| 7,182,601 B2 | | 2/2007 | Donnan |
| 7,212,213 B2 | * | 5/2007 | Steinberg et al. ............. 345/589 |
| 7,271,329 B2 | * | 9/2007 | Franzblau ..................... 84/609 |
| 7,400,361 B2 | * | 7/2008 | Noske et al. ................. 348/578 |
| 2002/0108484 A1 | | 8/2002 | Arnold et al. |
| 2003/0205124 A1 | * | 11/2003 | Foote et al. ................... 84/608 |
| 2004/0206225 A1 | * | 10/2004 | Wedel ...................... 84/477 R |
| 2005/0190199 A1 | | 9/2005 | Brown et al. |
| 2005/0241465 A1 | | 11/2005 | Goto |
| 2006/0163358 A1 | | 7/2006 | Biderman |
| 2006/0217766 A1 | | 9/2006 | Groover |
| 2006/0288842 A1 | | 12/2006 | Sitrick et al. |
| 2007/0044639 A1 | * | 3/2007 | Farbood et al. ................ 84/609 |
| 2007/0157795 A1 | * | 7/2007 | Hung .......................... 84/600 |
| 2007/0180979 A1 | * | 8/2007 | Rosenberg ................... 84/611 |
| 2008/0022842 A1 | | 1/2008 | Lemons |
| 2008/0264239 A1 | * | 10/2008 | Lemons et al. ............. 84/477 R |
| 2008/0271589 A1 | * | 11/2008 | Lemons ................... 84/477 R |
| 2008/0271590 A1 | * | 11/2008 | Lemons ..................... 84/483.2 |
| 2008/0271591 A1 | * | 11/2008 | Lemons ........................ 84/601 |
| 2008/0276790 A1 | * | 11/2008 | Lemons ................... 84/477 R |
| 2008/0276791 A1 | * | 11/2008 | Lemons ..................... 84/483.2 |
| 2008/0314228 A1 | * | 12/2008 | Dreyfuss et al. ........... 84/477 R |

FOREIGN PATENT DOCUMENTS

| | | |
|---|---|---|
| EP | 456860 A1 * | 11/1991 |
| EP | 1354561 A1 | 10/2003 |
| JP | 05-232856 | 9/1993 |
| JP | 2004-226556 A | 8/2004 |
| KR | 10-2006-0110988 | 10/2006 |

OTHER PUBLICATIONS

Ashton, Anthony, "Harmonograph: A Visual Guide to the Mathematics of Music," ISBN 0-8027-1409-9, Walker Publishing Company, 2003, pp. 1-58.

Bourke, Paul, "Harmonograph," Aug. 1999, http://local.wasp.uwa.edu.au/~pbourke/suraces_curves/harmonograph/, pp. 1-6, printed Aug. 30, 2007.

Dunne, Gabriel, "Color/Shape/Sound Ratio & Symmetry Calculator," Quilime.com—Symmetry Calculator, https://www.quilime.com/content/colorcalc/, pp. 1-6, printed Jul. 3, 2007.

Patent Application Search Report mailed on Aug. 1, 2008 for PCT/US2008/59126.

Patent Application Search Report mailed on Aug. 14, 2008 for PCT/US2008/004989.

Patent Application Search Report mailed on Aug. 18, 2008 for PCT/US2008/005069.

Patent Application Search Report mailed on Aug. 18, 2008 for PCT/US2008/005126.

Patent Application Search Report mailed on Aug. 18, 2008 for PCT/US2008/057073.

Patent Application Search Report mailed on Aug. 21, 2008 for PCT/US2008/005076.

Patent Application Search Report mailed on Aug. 27, 2008 for PCT/US2008/005075.

Patent Application Search Report mailed on Aug. 28, 2008 for PCT/US208/005077.

Patent Application Search Report mailed on Jul. 31, 2008 for PCT/US2008/005070.

Patent Application Search Report mailed on Sep. 18, 2008 for PCT/US2008/005072.

Patent Application Search Report mailed on Sep. 18, 2008 for PCT/US2008/5124.

Patent Application Search Report on Sep. 24, 2008 for PCT/US2008/005125.

Patent Application search Report mailed on Sep. 29, 2008 for PCT/US2008/005074.

Rabiner,Huang Fundamentals of Speech Recognition, PTR Prentice-Hall., 1993, ISBN 0-13-285826-6, pp. 21-31, 42-68;Figure 2.17, 2.32.

Patent Application Search Report mailed on Aug. 25, 2009 for PCT/US2009/000684.

Written Opinion mailed on Aug. 25, 2009 for PCT/US2009/00684.

Notification of International Preliminary Report on Patentability in PCT/US2008/004291, May 18, 2009.

* cited by examiner

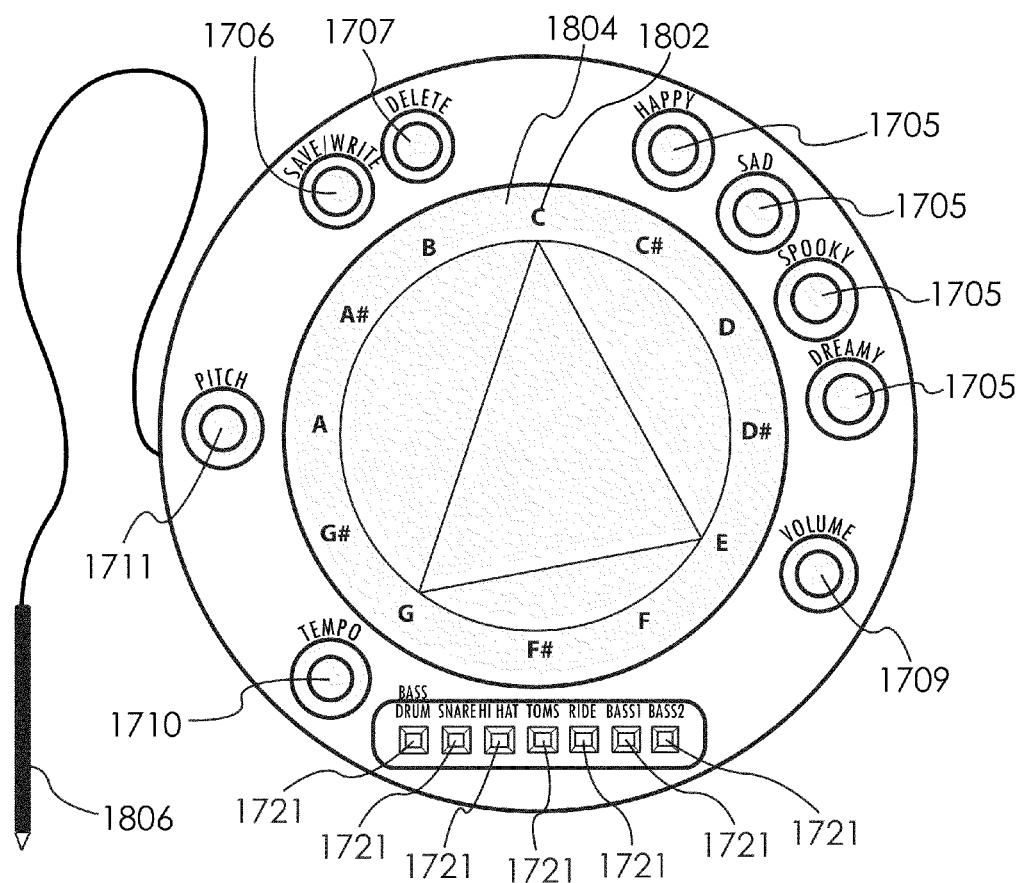
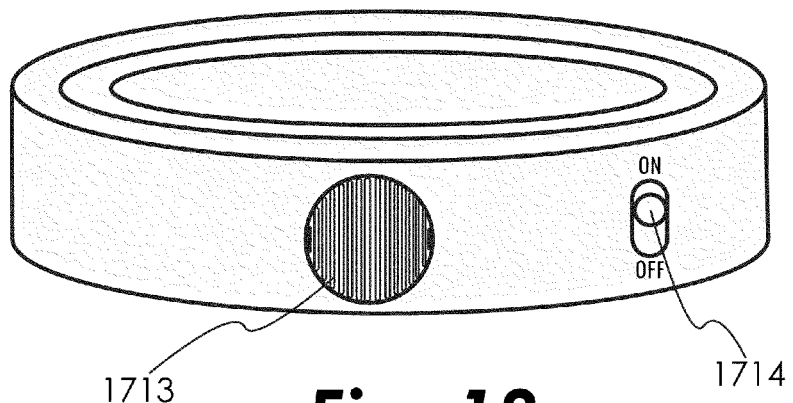
Fig. 18

CHILD DEVELOPMENT AND EDUCATION APPARATUS AND METHOD USING VISUAL STIMULATION

CROSS-REFERENCE TO RELATED APPLICATIONS

The present application claims the benefit of U.S. Provisional Patent Application Ser. No. 60/912,242, filed Apr. 17, 2007, entitled "Child Development and Education Apparatus and Method Using Visual Stimulation", and U.S. Provisional Patent Application Ser. No. 60/921,578 filed Apr. 3, 2007 entitled "Device and Method for Visualizing Musical Rhythmic Structures". This application also relates to U.S. Provisional Patent Application Ser. No. 60/830,386 filed Jul. 12, 2006 entitled "Apparatus and Method for Visualizing Musical Notation" and U.S. Utility patent application Ser. No. 11/827,264 filed Jul. 11, 2007 entitled "Apparatus and Method for Visualizing Music and Other Sounds" and U.S. Utility patent application Ser. No. 12/023,375 filed Jan. 31, 2008 entitled "Device and Method for Visualizing Musical Rhythmic Structures". All of these applications are hereby incorporated by reference in their entirety.

BACKGROUND OF THE INVENTION

It is well known that the ability to absorb new concepts and ideas is at its strongest during the early years of childhood development. For example, toddlers are generally able to learn a language, with correct accent, much more easily than adults. The ability to understand written music, however, is made difficult by the complexity of certain musical structures and the counter-intuitive nature of traditional music notation. Devices and methods are needed which will allow a child of young age to begin to understand musical structures, taking particular advantage of the child's heightened ability to learn both aurally and visually.

SUMMARY OF THE INVENTION

Accordingly, in one aspect, a child music education device is disclosed comprising: (a) an input sound source; (b) a control unit; (c) a processing unit; and (d) a display; wherein said processor is capable of creating a visual representation of said input sound source for output on said display; and wherein said visual representation is generated according to a predefined geometric scheme based on the tonal or rhythmic qualities of the audio information received from said input sound source.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

FIG. 18 is a music visualization and composition device using 'soft' buttons within a touch sensitive screen.

DETAILED DESCRIPTION

Figure 1:
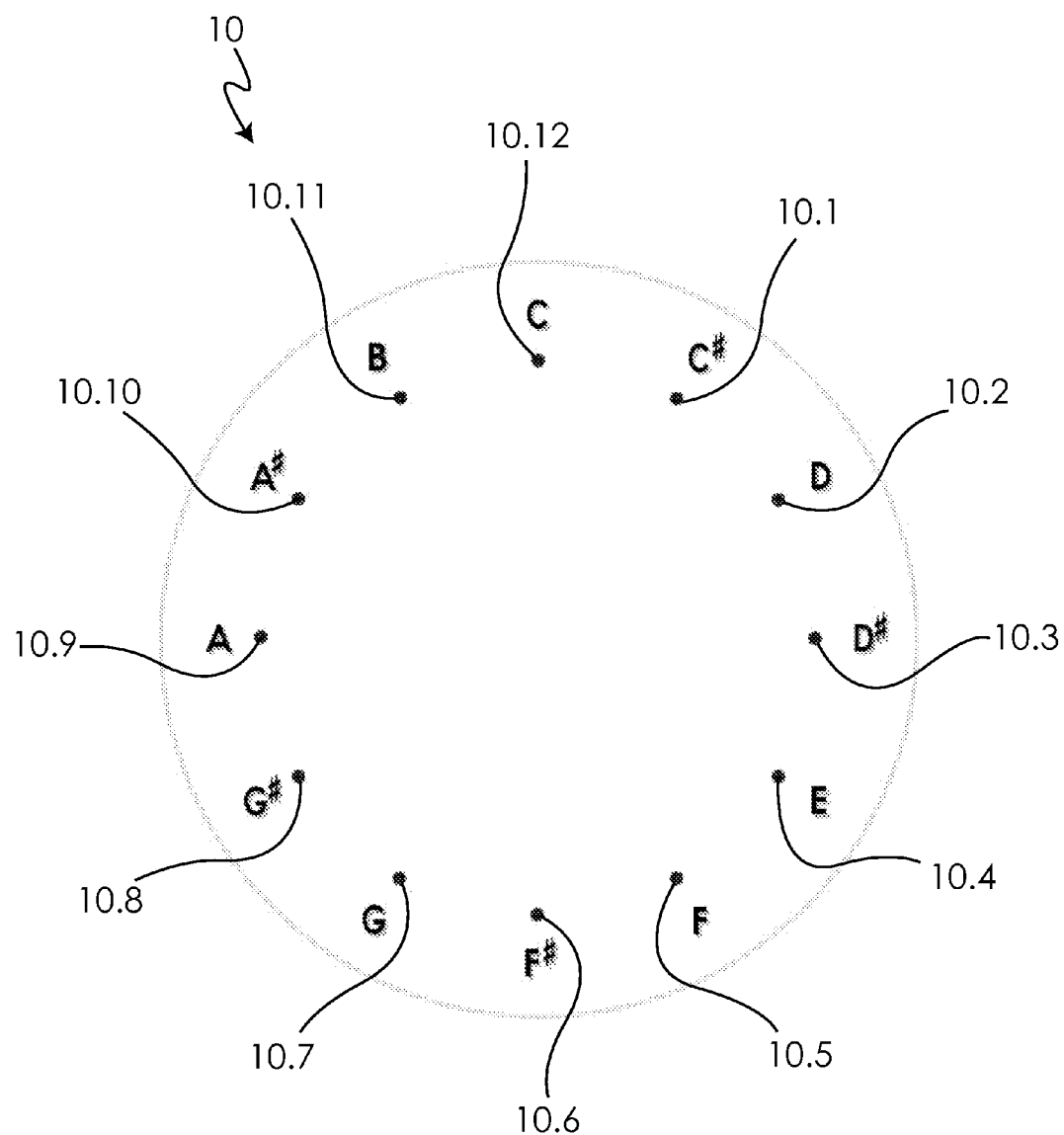
FIG. 1 is a diagram of a twelve-tone circle according to one embodiment.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein are herein contemplated as would normally occur to one skilled in the art to which the invention relates.

Before describing the child development and education apparatus, a summary of the above-referenced music tonal and rhythmic visualization methods will be presented. The tonal visualization methods are described in U.S. patent application Ser. No. 11/827,264 filed Jul. 11, 2007 entitled "Apparatus and Method for Visualizing Music and Other Sounds" which is hereby incorporated by reference.

There are three traditional scales or 'patterns' of musical tone that have developed over the centuries. These three scales, each made up of seven notes, have become the foundation for virtually all musical education in the modern world. There are, of course, other scales, and it is possible to create any arbitrary pattern of notes that one may desire; but the vast majority of musical sound can still be traced back to these three primary scales.

Each of the three main scales is a lopsided conglomeration of seven intervals:

Major scale: 2 steps, 2 steps, 1 step, 2 steps, 2 steps, 2 steps, 1 step

Harmonic Minor Scale: 2, 1, 2, 2, 1, 3, 1

Melodic Minor Scale: 2, 1, 2, 2, 2, 2, 1

Unfortunately, our traditional musical notation system has also been based upon the use of seven letters (or note names) to correspond with the seven notes of the scale: A, B, C, D, E, F and G. The problem is that, depending on which of the three scales one is using, there are actually twelve possible tones to choose from in the 'pool' of notes used by the three scales. Because of this discrepancy, the traditional system of musical notation has been inherently lopsided at its root.

With a circle of twelve tones and only seven note names, there are (of course) five missing note names. To compensate, the traditional system of music notation uses a somewhat arbitrary system of 'sharps' (#'s) and 'flats' (b's) to cover the remaining five tones so that a single notation system can be used to encompass all three scales. For example, certain key signatures will have seven 'pure letter' tones (like 'A') in addition to sharp or flat tones (like C♯ or G♯), depending on the key signature. This leads to a complex system of reading and writing notes on a staff, where one has to mentally juggle a key signature with various accidentals (sharps and flats) that are then added one note at a time. The result is that the seven-note scale, which is a lopsided entity, is presented as a straight line on the traditional musical notation staff. On the other hand, truly symmetrical patterns (such as the chromatic scale) are represented in a lopsided manner on the traditional musical staff. All of this inefficiency stems from the inherent flaw of the traditional written system being based upon the seven note scales instead of the twelve-tone circle.

To overcome this inefficiency, a set of mathematically based, color-coded MASTER KEY™ diagrams is presented to better explain the theory and structures of music using geometric form and the color spectrum. As shown in FIG. 1, the twelve tone circle 10 is the template upon which all of the other diagrams are built. Twelve points 10.1-10.12 are geometrically placed in equal intervals around the perimeter of the circle 10 in the manner of a clock; twelve points, each thirty degrees apart. Each of the points 10.1-10.12 on the circle 10 represents one of the twelve pitches. The names of the various pitches can then be plotted around the circle 10. It will be appreciated that in traditional musical notation there are more than one name for each pitch (e.g., A♯ is the same as B♭), which causes inefficiency and confusion since each note can be 'spelled' in two different ways. In the illustrated embodiment, the circle 10 has retained these traditional labels, although the present disclosure comprehends that alternative labels can be used, such as the letters A-L, or numbers 1-12. Furthermore, the circle 10 of FIG. 1 uses the sharp notes as labels; however, it will be understood that some or all of these sharp notes can be labeled with their flat equivalents and that some of the non-sharp and non-flat notes can be labeled with the sharp or flat equivalents.

Figure 2:
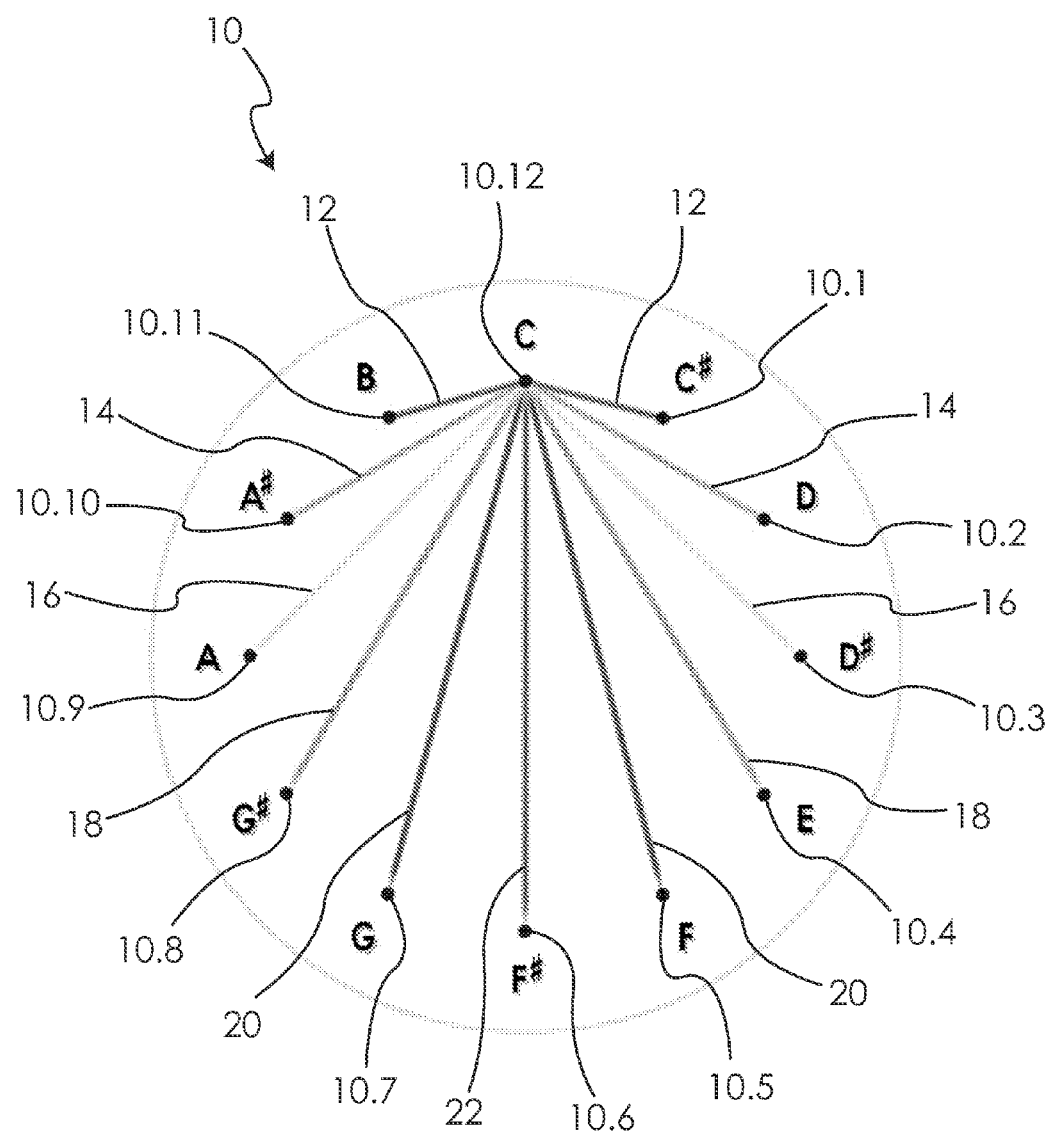
FIG. 2 is a diagram of a twelve-tone circle showing the six intervals.

The next 'generation' of the MASTER KEY™ diagrams involves thinking in terms of two note 'intervals.' The Interval diagram, shown in FIG. 2, is the second of the MASTER KEY™ diagrams, and is formed by connecting the top point 10.12 of the twelve-tone circle 10 to every other point 10.1-10.11. The ensuing lines—their relative length and color—represent the various 'intervals.' It shall be understood that while eleven intervals are illustrated in FIG. 2, there are actually only six basic intervals to consider. This is because any interval larger than the tri-tone (displayed in purple in FIG. 2) has a 'mirror' interval on the opposite side of the circle. For example, the whole-step interval between C (point 10.12) and D (point 10.2) is equal to that between C (point 10.12) and A♯ (point 10.10).

Another important aspect of the MASTER KEY™ diagrams is the use of color. Because there are six basic music intervals, the six basic colors of the rainbow can be used to provide another way to comprehend the basic structures of music. In a preferred embodiment, the interval line 12 for a half step is colored red, the interval line 14 for a whole step is colored orange, the interval line 16 for a minor third is colored yellow, the interval line 18 for a major third is colored green, the interval line 20 for a perfect fourth is colored blue, and the interval line 22 for a tri-tone is colored purple. In other embodiments, different color schemes may be employed. What is desirable is that there is a gradated color spectrum assigned to the intervals so that they may be distinguished from one another by the use of color, which the human eye can detect and process very quickly.

Figure 3:
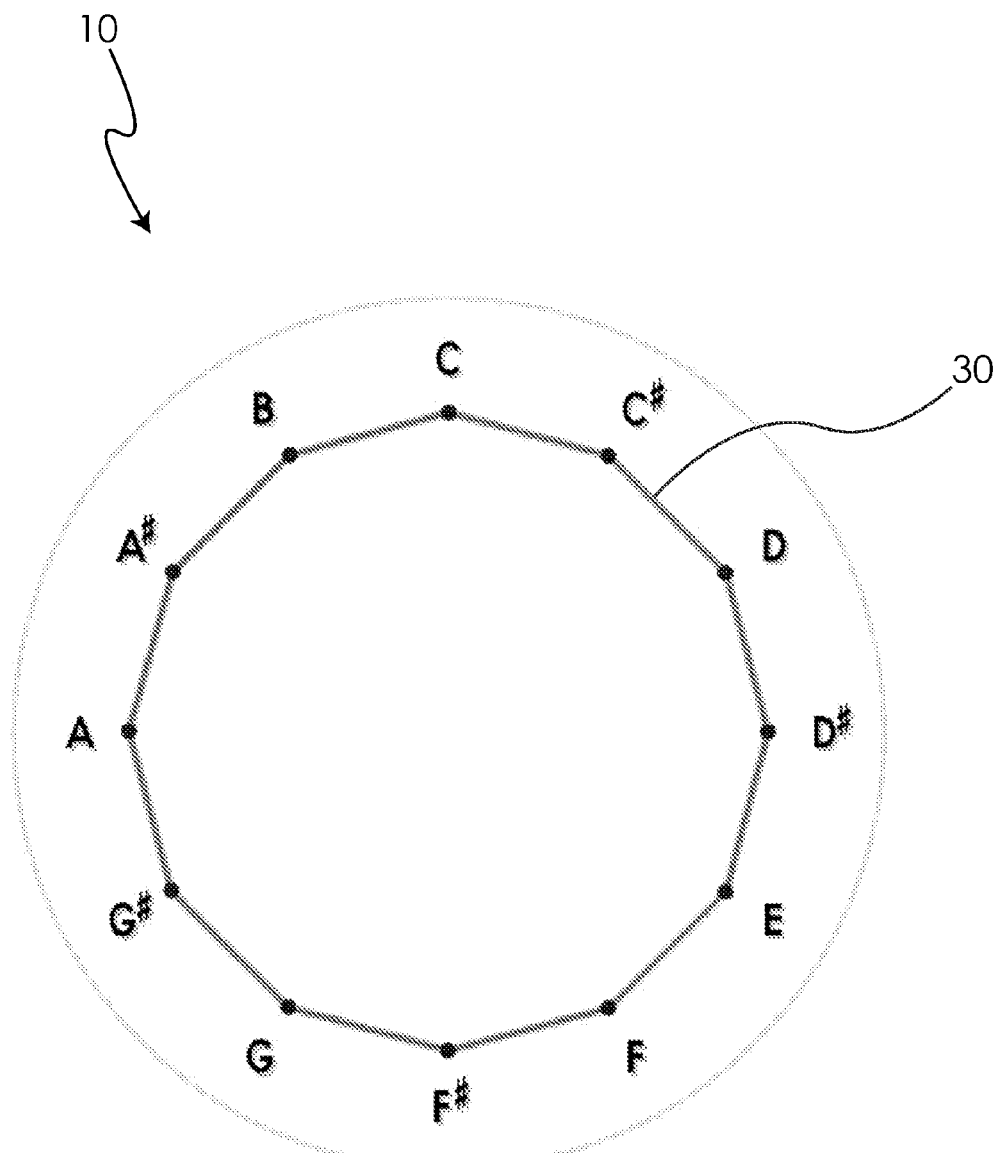
FIG. 3 is a diagram of a twelve-tone circle showing the chromatic scale.
Figure 4:
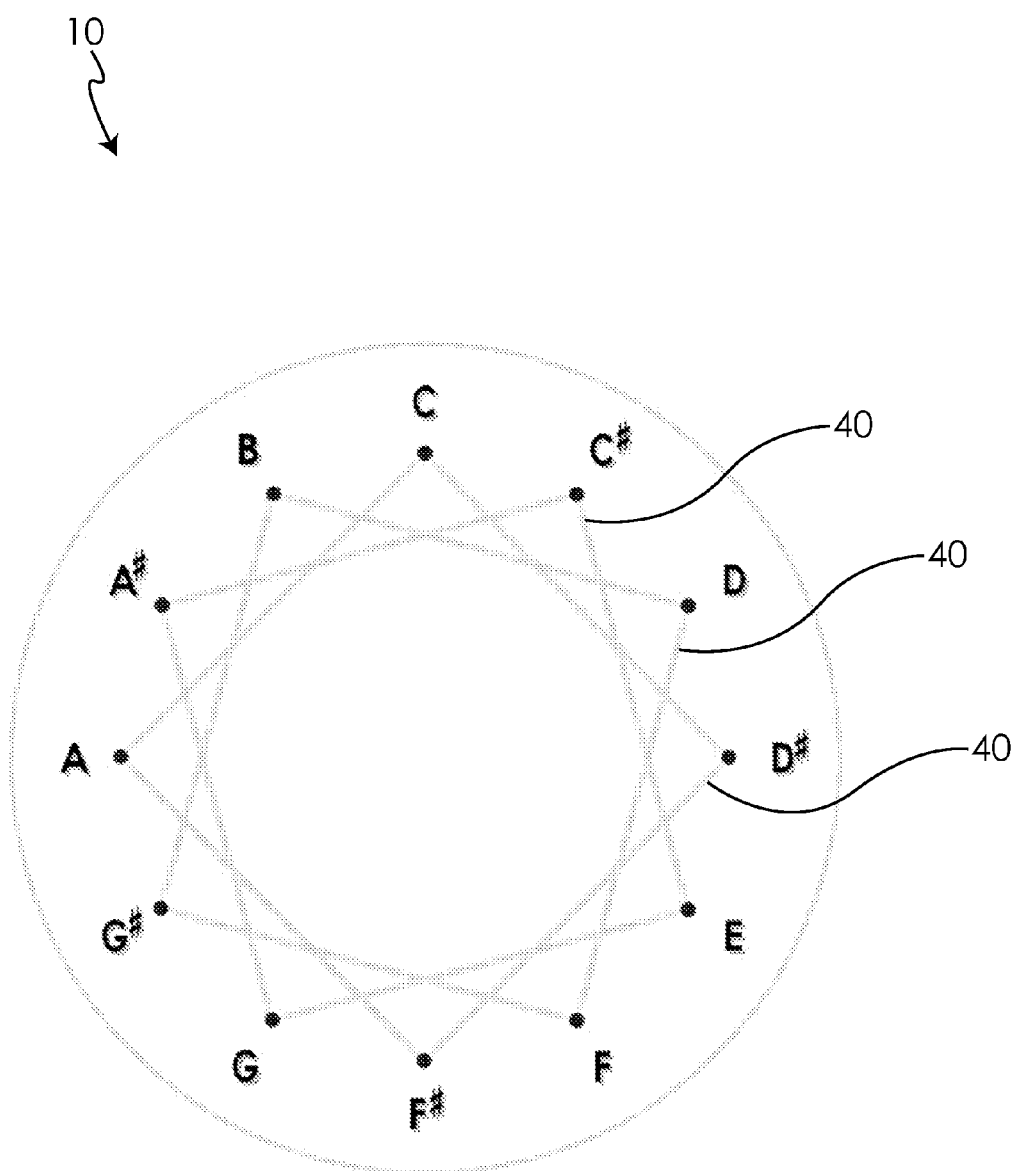
FIG. 4 is a diagram of a twelve-tone circle showing the first through third diminished scales.
Figure 5:
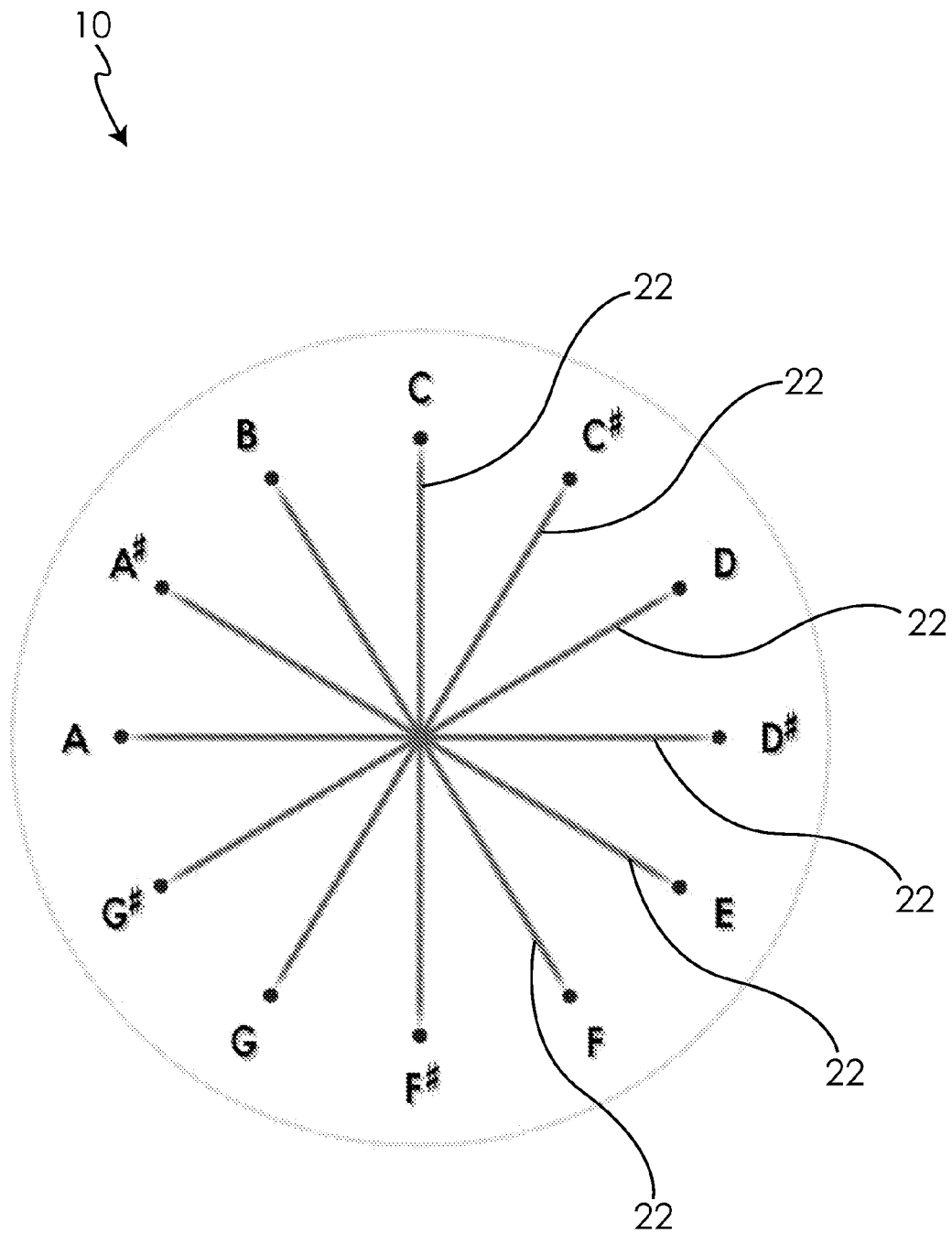
FIG. 5 is a diagram of a twelve-tone circle showing all six tri-tones.

The next group of MASTER KEY™ diagrams pertains to extending the various intervals 12-22 to their completion around the twelve-tone circle 10. This concept is illustrated in FIG. 3, which is the diagram of the chromatic scale. In these diagrams, each interval is the same color since all of the intervals are equal (in this case, a half-step). In the larger intervals, only a subset of the available tones is used to complete one trip around the circle. For example, the minor-third scale, which gives the sound of a diminished scale and forms the shape of a square 40, requires three transposed scales to fill all of the available tones, as illustrated in FIG. 4. The largest interval, the tri-tone, actually remains a two-note shape 22, with six intervals needed to complete the circle, as shown in FIG. 5.

Figure 6:
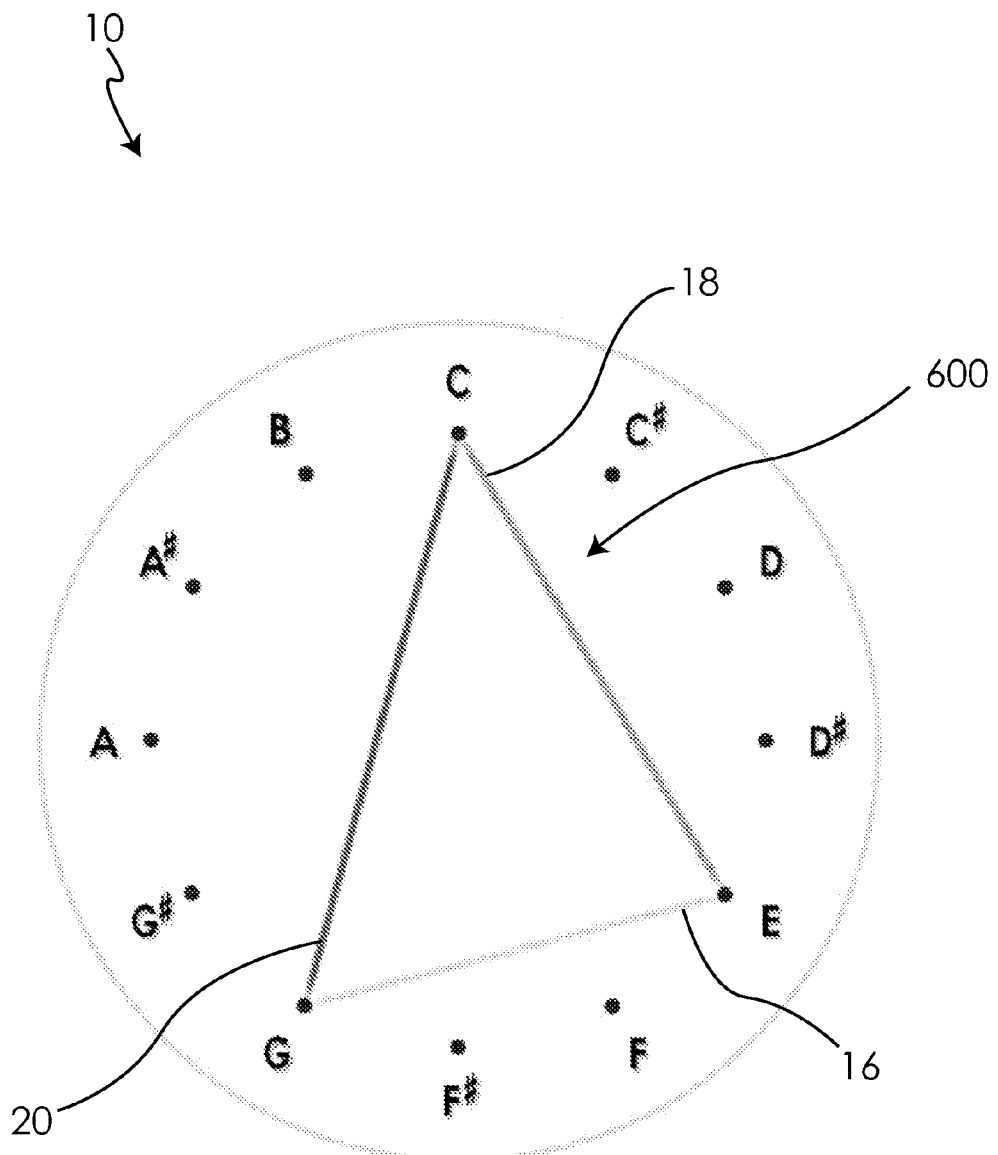
FIG. 6 is a diagram of a twelve-tone circle showing a major triad.

The next generation of MASTER KEY™ diagrams is based upon musical shapes that are built with three notes. In musical terms, three note structures are referred to as triads. There are only four triads in all of diatonic music, and they have the respective names of major, minor, diminished, and augmented. These four, three-note shapes are represented in the MASTER KEY™ diagrams as different sized triangles, each built with various color coded intervals. As shown in FIG. 6, for example, the major triad 600 is built by stacking (in a clockwise direction) a major third 18, a minor third 16, and then a perfect fourth 20. This results in a triangle with three sides in the respective colors of green, yellow, and blue, following the assigned color for each interval in the triad. The diagrams for the remaining triads (minor, diminished, and augmented) follow a similar approach.

Figure 7:
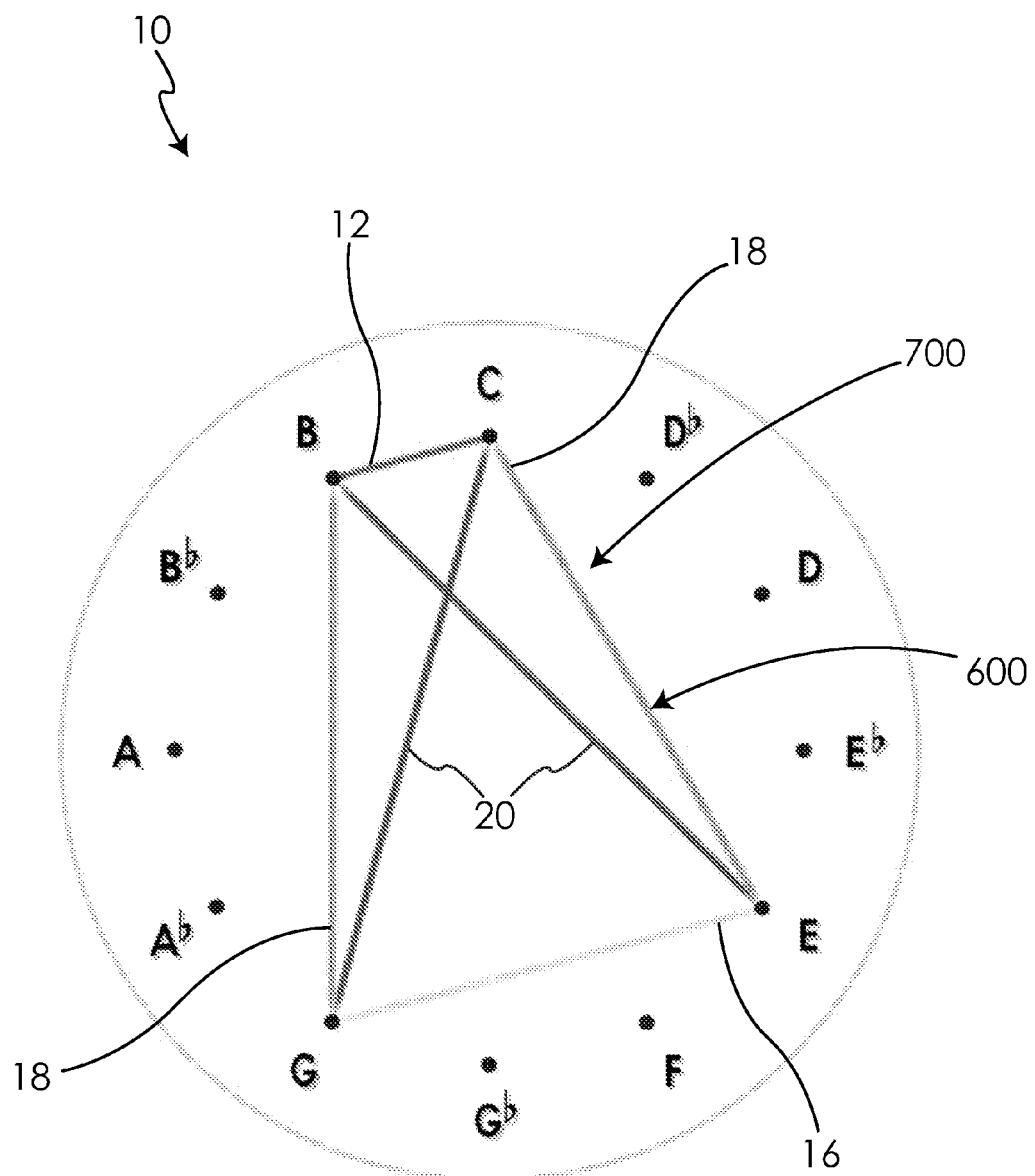
FIG. 7 is a diagram of a twelve-tone circle showing a major seventh chord.

The next group of MASTER KEY™ diagrams are developed from four notes at a time. Four note chords, in music, are referred to as seventh chords, and there are nine types of seventh chords. FIG. 7 shows the diagram of the first seventh chord, the major seventh chord 700, which is created by stacking the following intervals (as always, in a clockwise manner): a major third, a minor third 16, another major third 18, and a half step 12. The above description illustrates the outer shell of the major seventh chord 700 (a four-sided polyhedron); however, general observation will quickly reveal a new pair of 'internal' intervals, which haven't been seen in previous diagrams (in this instance, two perfect fourths 20). The eight remaining types of seventh chords can likewise be mapped on the MASTER KEY™ circle using this method.

Figure 8:
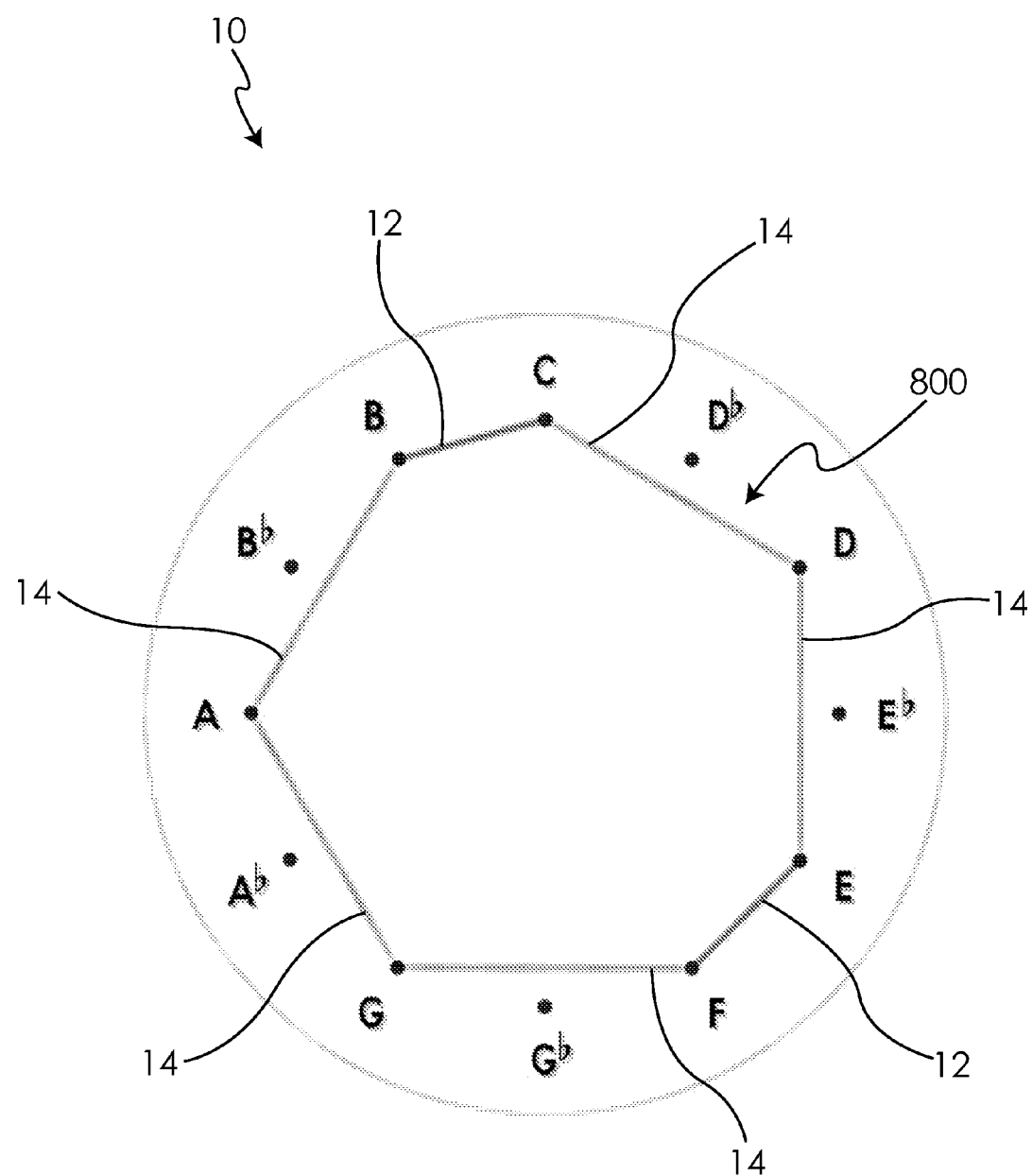
FIG. 8 is a diagram of a twelve-tone circle showing a major scale.

Every musical structure that has been presented thus far in the MASTER KEY™ system, aside from the six basic intervals, has come directly out of three main scales. Again, the three main scales are as follows: the Major Scale, the Harmonic-Minor Scale, and the Melodic-Minor Scale. The major scale is the most common of the three main scales and is heard virtually every time music is played or listened to in the western world. As shown in FIG. 8 and indicated generally at 800, the MASTER KEY™ diagram clearly shows the major scale's 800 makeup and its naturally lopsided nature. Starting at the top of the circle 10, one travels clockwise around the scale's outer shell. The following pattern of intervals is then encountered: whole step 14, whole step 14, half step 12, whole step 14, whole step 14, whole step 14, half step 12. The most important aspect of each scale diagram is, without a doubt, the diagram's outer 'shell.' Therefore, the various internal intervals in the scale's interior are not shown. Since we started at point 10.12, or C, the scale 800 is the C major scale. Other major scales may be created by starting at one of the other notes on the twelve-tone circle 10. This same method can be used to create diagrams for the harmonic minor and melodic minor scales as well.

Figure 9:
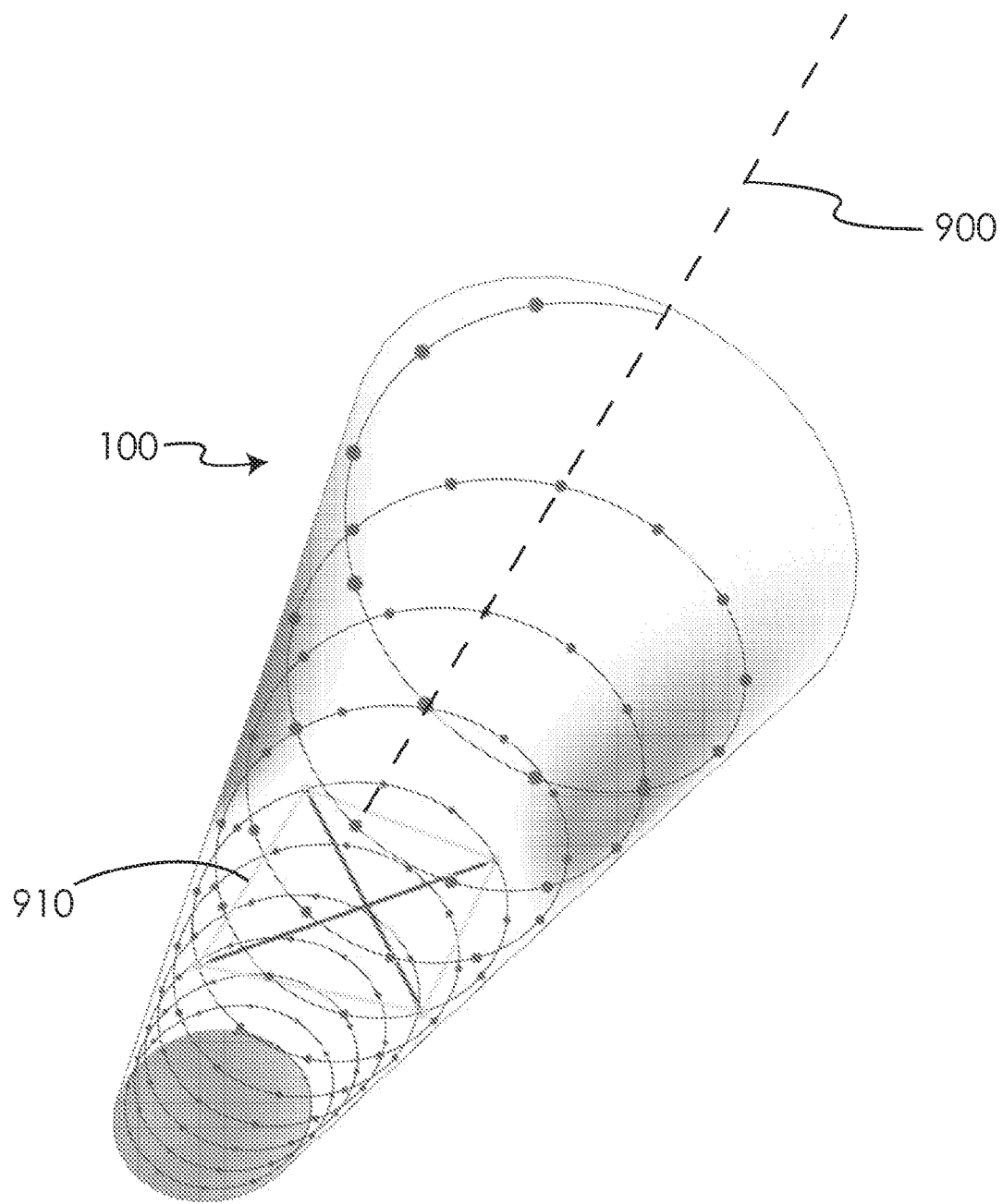
FIGS. 9-10 are diagrams of a helix showing a B diminished seventh chord.
Figure 10:
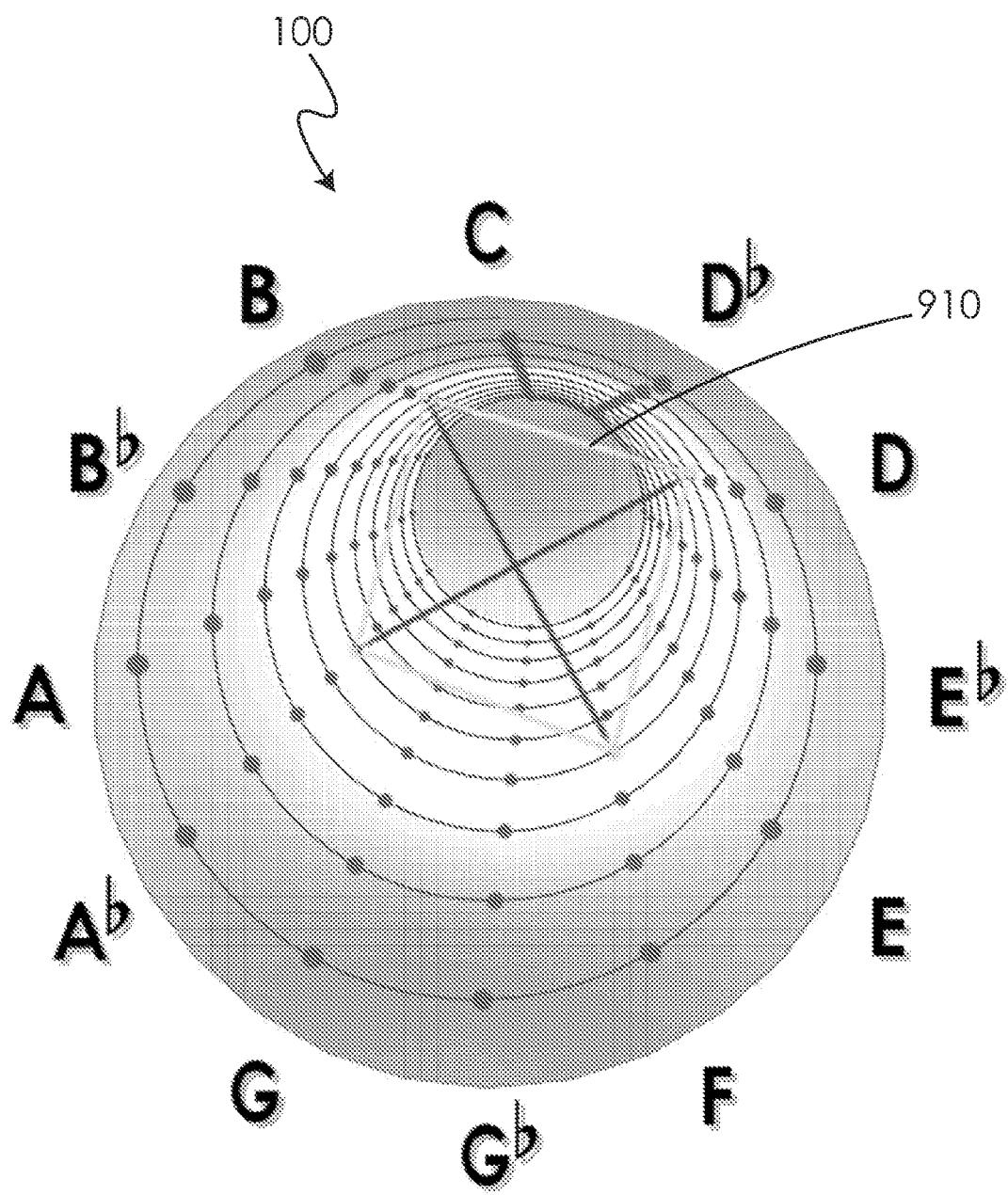

The previously described diagrams have been shown in two dimensions; however, music is not a circle as much as it is a helix. Every twelfth note (an octave) is one helix turn higher or lower than the preceding level. What this means is that music can be viewed not only as a circle but as something that will look very much like a DNA helix, specifically, a helix of approximately ten and one-half turns (i.e. octaves). There are only a small number of helix turns in the complete spectrum of audible sound; from the lowest auditory sound to the highest auditory sound. By using a helix instead of a circle, not only can the relative pitch difference between the notes be discerned, but the absolute pitch of the notes can be seen as well. For example, FIG. 9 shows a helix 100 about an axis 900 in a perspective view with a chord 910 (a fully diminished seventh chord in this case) placed within. In FIG. 10, the perspective has been changed to allow each octave point on consecutive turns of the helix to line up. This makes it possible to use a single set of labels around the helix. The user is then able to see that this is a B fully diminished seventh chord and discern which octave the chord resides in.

Figure 11:
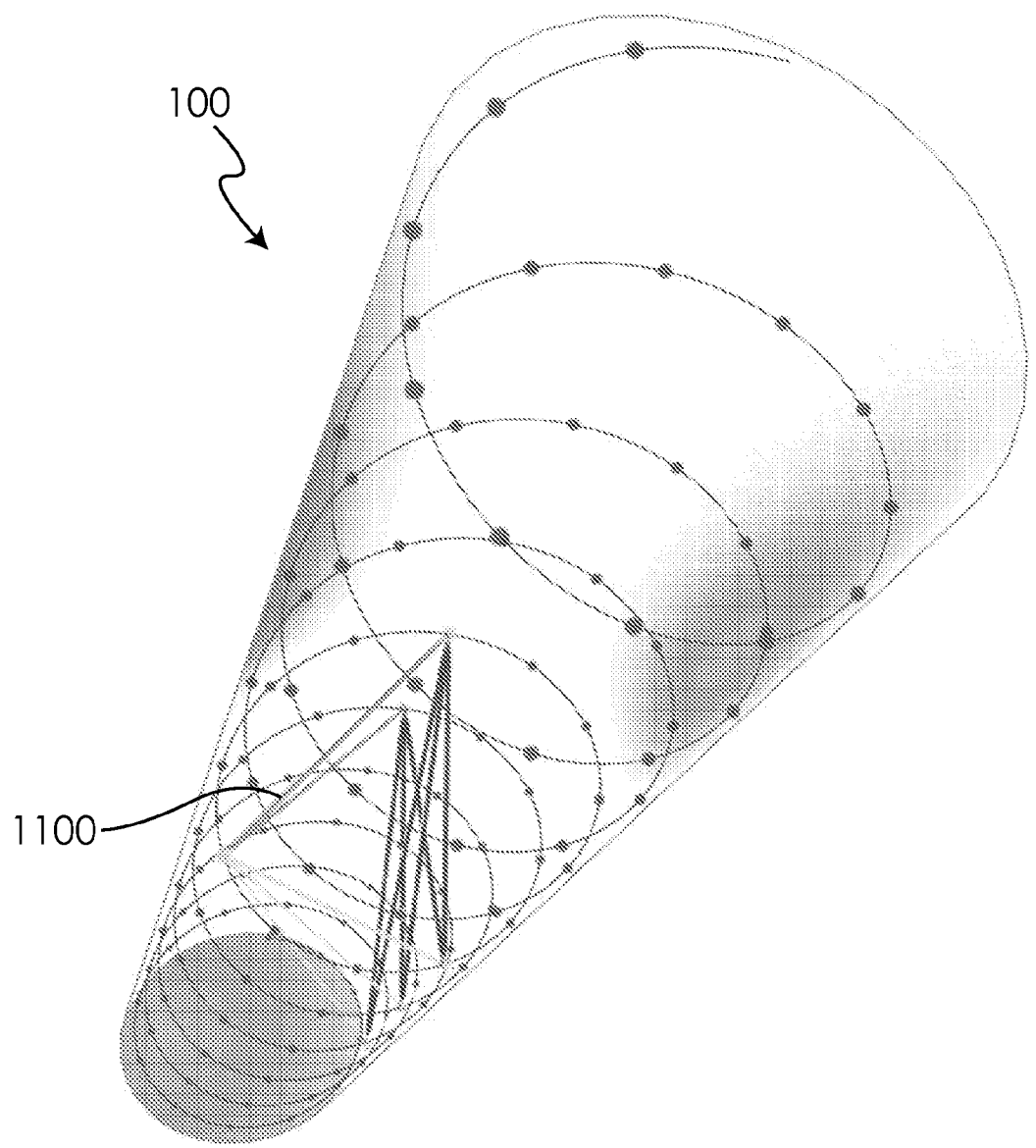
FIG. 11 is a diagram of a helix showing an F minor triad covering three octaves.

The use of the helix becomes even more powerful when a single chord is repeated over multiple octaves. For example, FIG. 11 shows how three F minor triad chords look when played together over three and one-half octaves. In two dimensions, the user will only see one triad, since all three of the triads perfectly overlap on the circle. In the three-dimensional helix, however, the extended scale is visible across all three octaves.

The above described MASTER KEY™ system provides a method for understanding the tonal information within musical compositions. Another method, however, is needed to deal with the rhythmic information, that is, the duration of each of the notes and relative time therebetween. Such rhythmic visualization methods are described in U.S. Utility patent application Ser. No. 12/023,375 filed Jan. 31, 2008 entitled "Device and Method for Visualizing Musical Rhythmic Structures" which is also hereby incorporated by reference.

In addition to being flawed in relation to tonal expression, traditional sheet music also has shortcomings with regards to rhythmic information. This becomes especially problematic for percussion instruments that, while tuned to a general frequency range, primarily contribute to the rhythmic structure of music. For example, traditional staff notation 1250, as shown in the upper portion of FIG. 12, uses notes 1254 of basically the same shape (an oval) for all of the drums in a modern drum kit and a single shape 1256 (an 'x' shape) for all of the cymbals. What is needed is a method that more intuitively conveys the character of individual rhythmic instruments and the underlying rhythmic structures present in a given composition.

Figure 12:
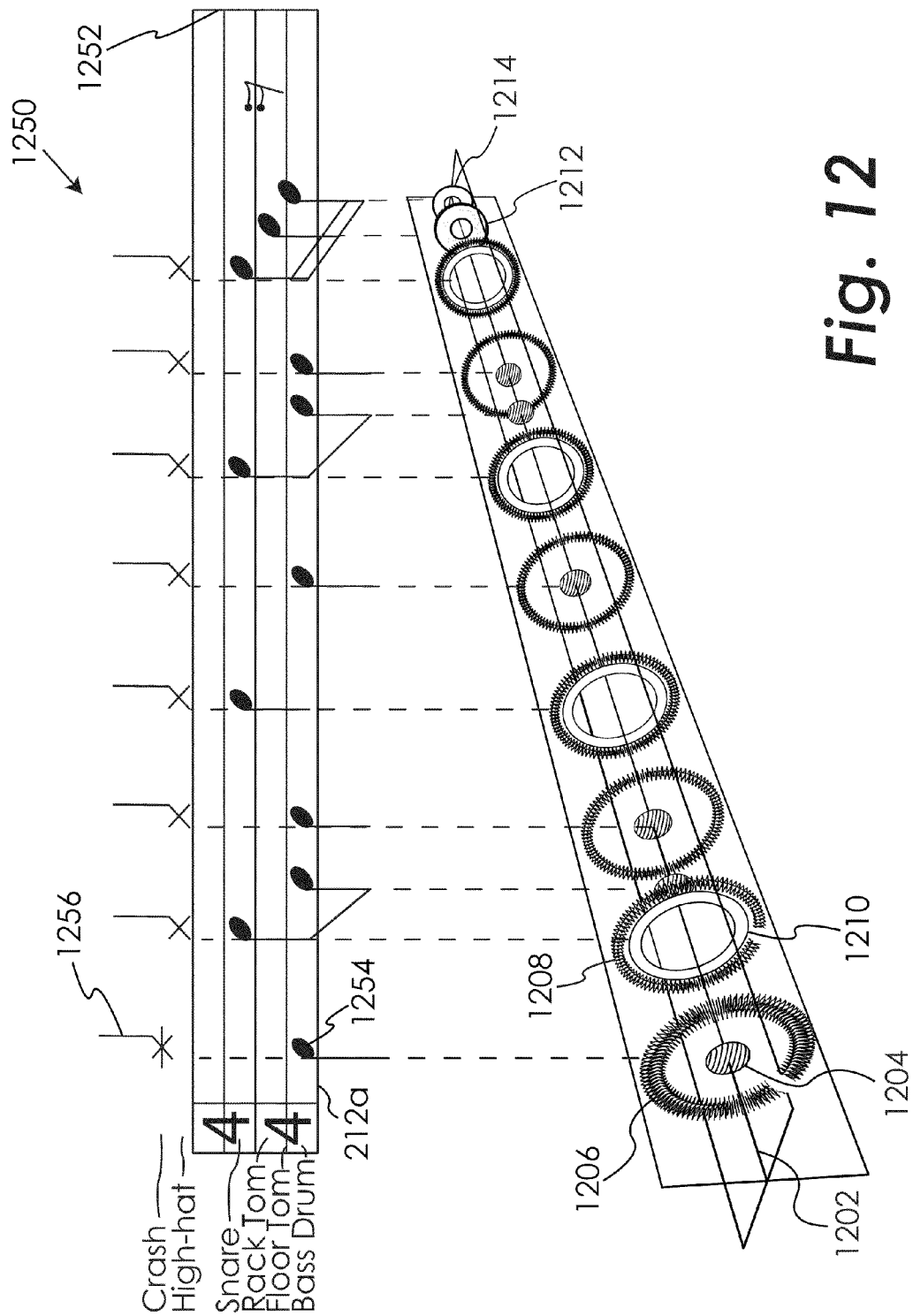
FIG. 12 is a perspective view of the visual representation of percussive music according to one embodiment shown with associated standard notation for the same percussive music.

The lower portion of FIG. 12 shows one embodiment of the disclosed method which utilizes spheroids 1204 and toroids 1206, 1208, 1210, 1212 and 1214 of various shapes and sizes in three dimensions placed along a time line 1202 to represent the various rhythmic components of a particular musical composition. The lowest frequencies or lowest instrument in the composition (i.e. the bass drum) will appear as spheroids 1204. As the rhythmical frequencies get higher in range, toroids 1206, 1208, 1210, 1212 and 1214 of various sizes are used to represent the sounded instrument. While the diameter and thicknesses of these spheroids and toroids may be adjustable components that are customizable by the user, the focus will primarily be on making the visualization as "crisply" precise as possible. In general, therefore, as the relative frequency of the sounded instrument increases, the maximum diameter of the spheroid or toroid used to depict the sounding of the instrument also increases. For example, the bass drum is represented by a small spheroid 1204, the floor tom by toroid 1212, the rack tom by toroid 1214, the snare by toroid 1210, the high-hat cymbal by toroid 1208, and the crash cymbal by toroid 1206. Those skilled in the art will recognize that other geometric shapes may be utilized to represent the sounds of the instruments within the scope of the disclosure.

Figure 13:
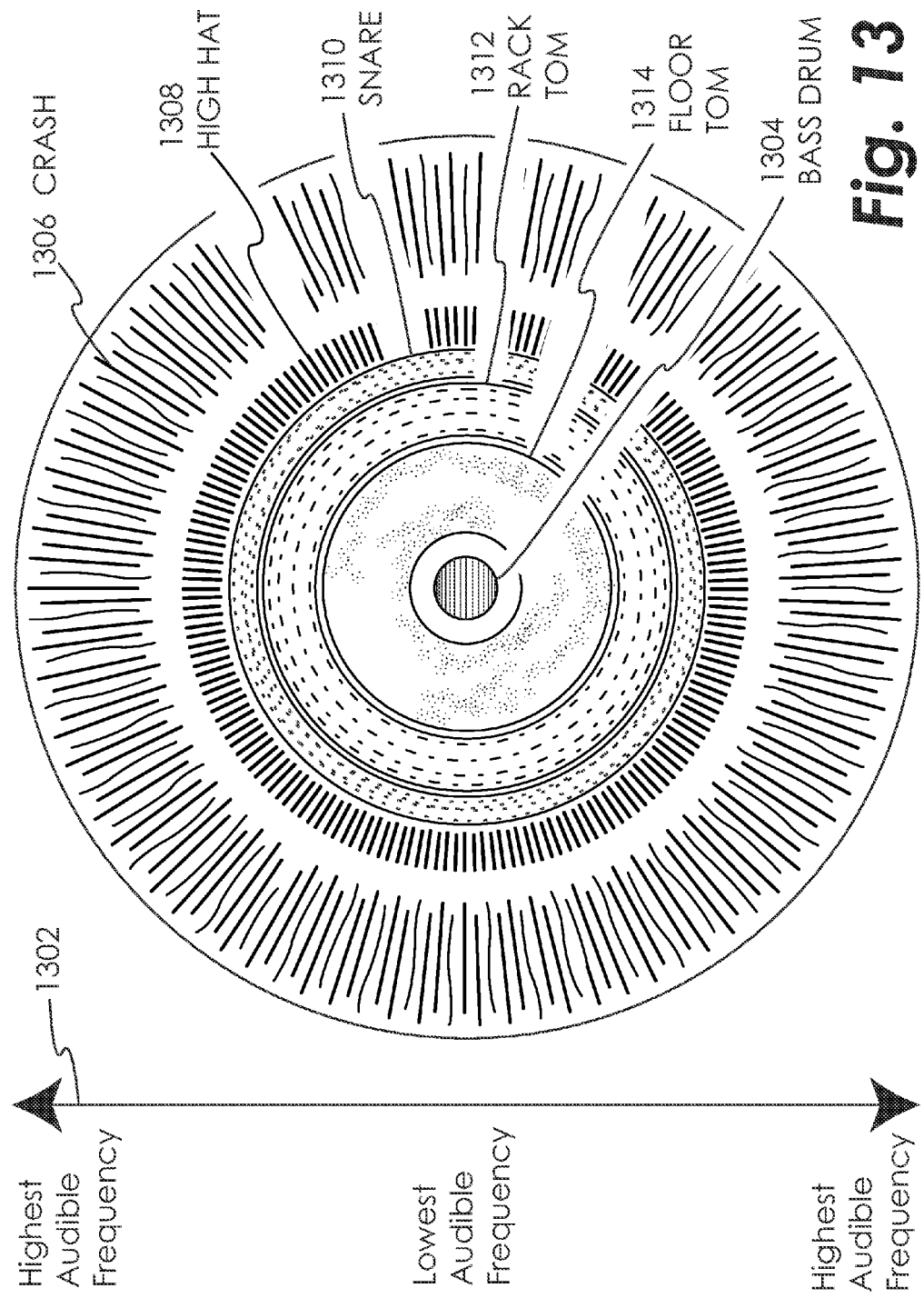
FIG. 13 is a two dimensional view looking along the time line of a visual representation of percussive music at an instant when six percussive instruments are being simultaneously sounded.

FIG. 13 shows another embodiment which utilizes a two-dimensional view looking into the time line 1202. In this embodiment, the spheroids 1204 and toroids 1206, 1208, 1210 and 1212 from FIG. 12 correspond to circles 1304 and rings 1306, 1308, 1310 and 1312, respectively. The lowest frequencies (i.e. the bass drum) will appear as a solid circle 1304 in a hard copy embodiment. Again, as the relative frequency of the sounded instrument increases, the maximum diameter of the circle or ring used to depict the sounding of the instrument also increases, as shown by the scale 1302.

Because cymbals have a higher auditory frequency than drums, cymbal toroids have a resultantly larger diameter than any of the drums. Furthermore, the amorphous sound of a cymbal will, as opposed to the crisp sound of a snare, be visualized as a ring of varying thickness, much like the rings of a planet or a moon. The "splash" of the cymbal can then be animated as a shimmering effect within this toroid. In one embodiment, the shimmering effect can be achieved by randomly varying the thickness of the toroid at different points over the circumference of the toroid during the time period in which the cymbal is being sounded as shown by toroid 1204 and ring 1306 in FIGS. 12 and 13, respectively. It shall be understood by those with skill in the art that other forms of image manipulation may be used to achieve this shimmer effect.

Figure 14:
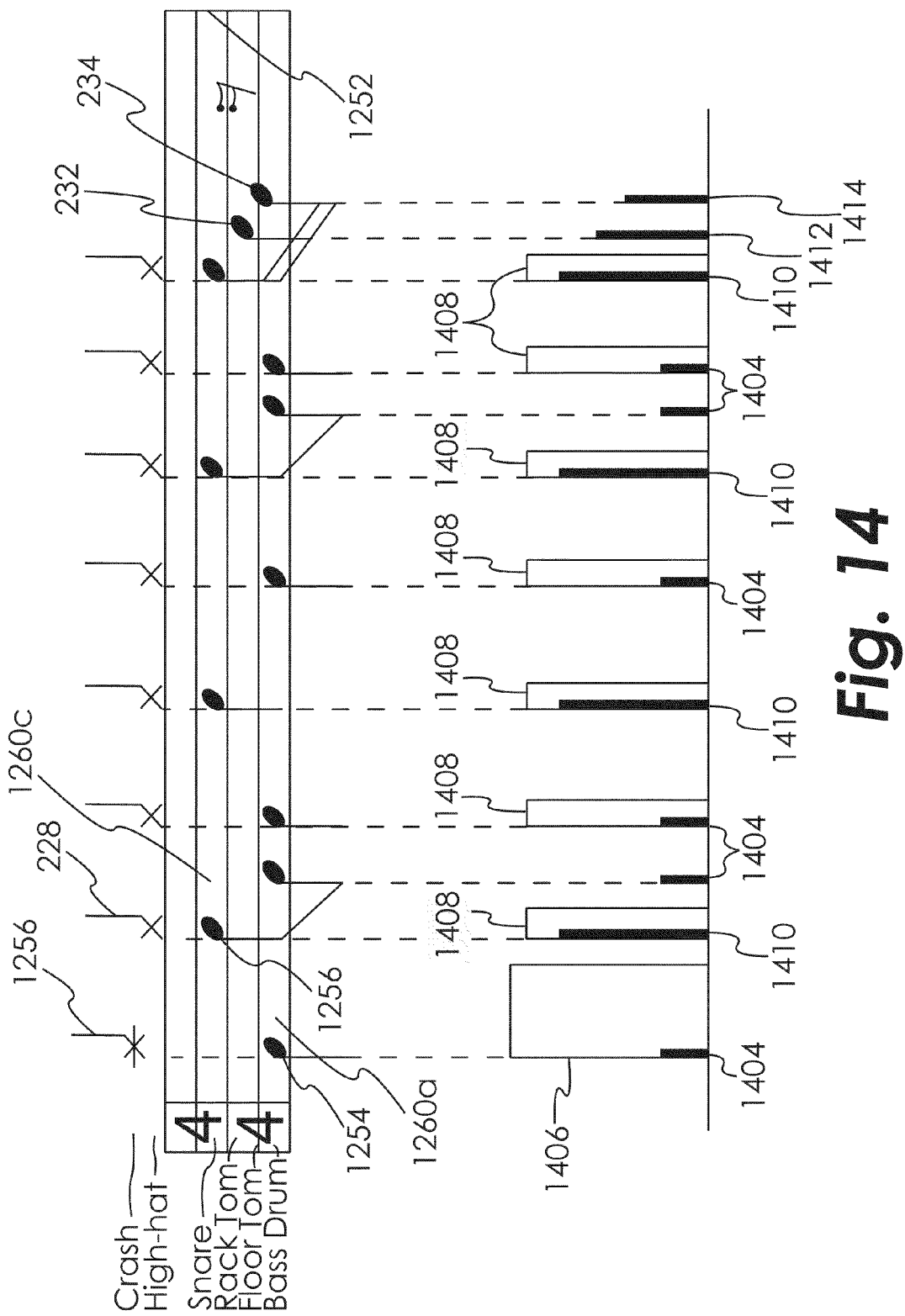
FIG. 14 is a two dimensional view looking perpendicular to the time line of the visual representation of percussive music according to the disclosure associated with standard notation for the same percussive music of FIG. 12.

FIG. 14 shows another embodiment which utilizes a two dimensional view taken perpendicular to the time line 1202. In this view, the previously seen circles, spheroids, rings or toroids turn into bars of various height and thickness. Spheroids 1204 and toroids 1206, 1208, 1210, 1212 and 1214 from FIG. 12 correspond to bars 1404, 1406, 1408, 1410, 1412, and 1414 in FIG. 14. For each instrument, its corresponding bar has a height that relates to the particular space or line in, above, or below the staff on which the musical notation for that instrument is transcribed in standard notation. Additionally, the thickness of the bar for each instrument corresponds with the duration or decay time of the sound played by that instrument. For example, bar 1406 is much wider than bar 1404, demonstrating the difference in duration when a bass drum and a crash cymbal are struck. To enhance the visual effect when multiple instruments are played simultaneously, certain bars may be filled in with color or left open.

The spatial layout of the two dimensional side view shown in FIG. 14 also corresponds to the time at which the instrument is sounded, similar to the manner in which music is displayed in standard notation (to some degree). Thus, the visual representation of rhythm generated by the disclosed system and method can be easily converted to sheet music in standard notation by substituting the various bars (and spaces therebetween) into their corresponding representations in standard notation. For example, bar 1404 (representing the bass drum) will be converted to a note 1254 in the lowest space 1260a of staff 1252. Likewise, bar 1410 (representing the snare drum) will be converted to a note 1256 in the second highest space 1260c of staff 1252.

The 3-D visualization of this Rhythmical Component as shown, for example, in FIG. 12, results in imagery that appears much like a 'wormhole' or tube. For each composition of music, a finite length tube is created by the system which represents all of the rhythmic structures and relationships within the composition. This finite tube may be displayed to the user in its entirety, much like traditional sheet music. For longer compositions, the tube may be presented to the user in sections to accommodate different size video display screens. To enhance the user's understanding of the particular piece of music, the 3-D 'wormhole' image may incorporate real time animation, creating the visual effect of the user traveling through the tube. In one embodiment, the rhythmic structures appear at the point "nearest" to the user as they occur in real time, and travel towards the "farthest" end of the tube, giving the effect of the user traveling backwards through the tube.

The two-dimensional view of FIG. 13 can also be modified to incorporate a perspective of the user looking straight "into" the three-dimensional tube or tunnel, with the graphical objects made to appear "right in front of" the user and then move away and into the tube, eventually shrinking into a distant center perspective point. It shall be understood that animation settings for any of the views in FIGS. 12-14 can be modified by the user in various embodiments, such as reversing the animation direction or the duration of decay for objects which appear and the fade into the background. This method of rhythm visualization may also incorporate the use of color to distinguish the different rhythmic structures within a composition of music, much like the MASTER KEY™ diagrams use color to distinguish between tonal intervals. For example, each instance of the bass drum being sounded can be represented by a sphere of a given color to help the user visually distinguish it when displayed among shapes representing other instruments.

In other embodiments, each spheroid (whether it appears as such or as a circle or line) and each toroid (whether it appears as such or as a ring, line or bar) representing a beat when displayed on the graphical user interface will have an associated small "flag" or access control button. By mouse-clicking on one of these access controls, or by click-dragging a group of controls, a user will be able to highlight and access a chosen beat or series of beats. With a similar attachment to the Master Key™ music visualization software (available from Musical DNA LLC, Indianapolis, Ind.), it will become very easy for a user to link chosen notes and musical chords with certain beats and create entire musical compositions without the need to write music using standard notation. This will allow access to advanced forms of musical composition and musical interaction for musical amateurs around the world.

Figure 15:
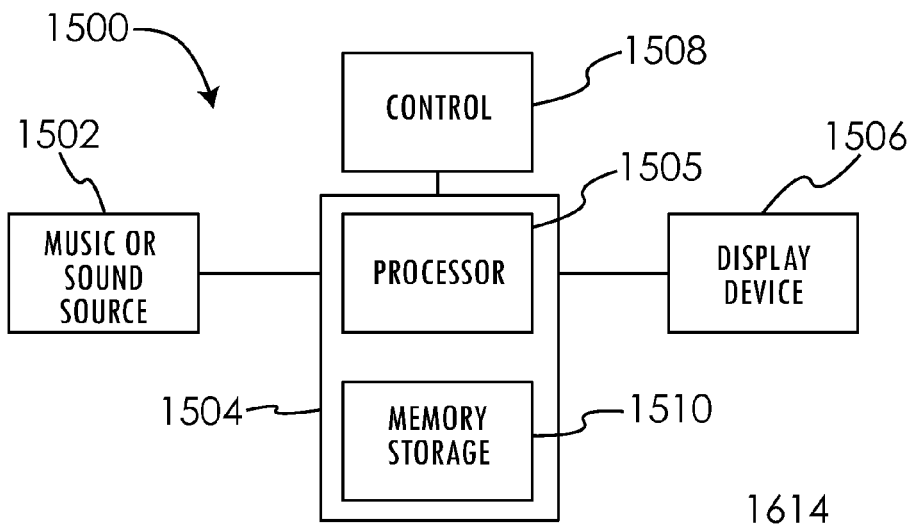
FIG. 15 is a schematic block diagram showing a music and sound education device according to one embodiment.

The previously described tonal and rhythmic visualization methods can form the basis for a number of different applications. FIG. 15, shows, in schematic form, one embodiment of a music or sound visualization device 1500 that can be used with infants and small children. Device 1500 is illustratively shown as comprising music source 1502, processing unit 1504 for creating tonal and rhythmic visualization signals, control unit 1508 and display device 1506 which receives the visualization signals and provides the tonal and rhythmic visualizations such as those previously described.

Figure 16:
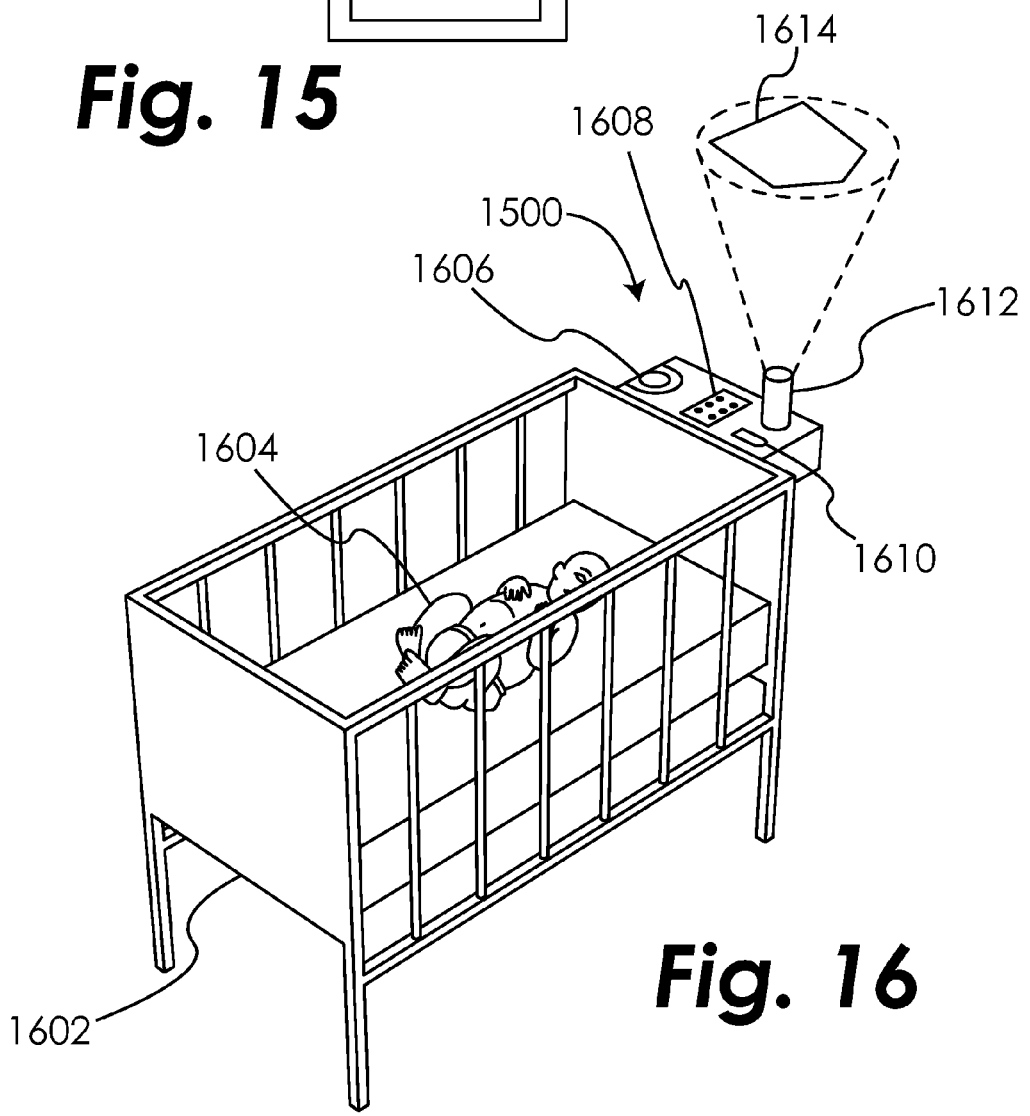
FIG. 16 is a music visualization device for use with a child's crib or bed according to one embodiment.

Music source 1502 may comprise a digital music player, such as an MP3 player, CD player, digital music file, audio tape player, or other music input devices known in the art. Display device 1506 may be implemented as a projector, for example as shown in FIG. 16, that can present the tonal and rhythm images as projections on a ceiling or wall, for example. In other embodiments, display device 1506 may present images as holographs directly in the air. In still further embodiments, display device 1506 may be provided as an integral LCD or other type of screen display.

Processing unit 1504 includes one or more processors 1505 and one or more types of memory 1510. Each processor 1505 may be comprised of one or more components configured as a single unit. Alternatively, when of a multi-component form, a processor 1505 may have one or more components located remotely relative to the others. One or more components of each processor 1505 may be of the electronic variety defining digital circuitry, analog circuitry, or both. Each memory 1510 may include one or more types of solid-state electronic memory, magnetic memory, or optical memory, just to name a few. By way of non-limiting example, each memory 1510 may include solid-state Random Access Memory (RAM), Sequentially Accessible Memory (SAM) (such as the First-In, First-Out (FIFO) variety or the Last-In-First-Out (LIFO) variety), Programmable Read Only Memory (PROM), Electronically Programmable Read Only Memory (EPROM), or Electrically Erasable Programmable Read Only Memory (EEPROM); an optical disc memory (such as a DVD or CD ROM); a magnetically encoded hard disc, floppy disc, tape, or cartridge media; or a combination of any of these memory types. Also, each memory may be volatile, nonvolatile, or a hybrid combination of volatile and nonvolatile varieties.

Device 1500 may be constructed to allow, via control 1508, the selection of only tonal or rhythm visualizations, or to limit the degree of complexity of the visualization images as may be desired to control the manner in which infants and children are introduced to the visualization of music and sounds. For example, the user may be able to select whether two-dimensional or three-dimensional visualizations will be generated, whether real time animation will be used, or even the 'direction' of the animation. Control 1508 may also be configured to accept electronic media cards or modules that may upgrade or provide additional features to device 1500, such as music-based games or activities. Other features or characteristics may be selectable or controllable via control 1508 as well, such as image size and location, image focus, audio program selection, and audio volume. The examples described are not meant to be limiting in any way.

Device 1500 may be configured to be attached to crib 1602 of an infant 1604, as is illustratively shown in FIG. 16, or a small child's bed. In the example shown in FIG. 16, device 1500 incorporates a CD player 1606, a control panel 1608, a speaker 1610, and a projector 1612, illustratively shown projecting an image 1614. Device 1500 may also be made to be portable so that a child can carry it from place to place. In such an embodiment, device 1500 preferably incorporates an integral display screen, for example. As will be evident to those skilled in the art, device 1500 may be made to operate from batteries or AC power, in accordance with the safety of the user in mind.

Music source 1502 may include, for example, a microphone that can be used to allow a child's own voice, or sounds made by blocks, bells or other instruments, to create the visualization images. For example, a child (or parent) can play an external toy bell close to the microphone and see the resulting visualized image. In addition, various instruments can be mounted on the device 1500 which the child can then play. The processor 1504 can then receive the generated audio signal from the microphone or, for example, by piezo-electric or magnetic pickups, transducers, or other audio sensing means known in the art.

In other embodiments, the device 1500 incorporates an interactive recording and playback feature. These embodiments utilize memory storage 1510 for storing recorded audio and visualization information. The child is then be able to sing or play instruments while recording, and then play back the recorded audio while viewing the corresponding graphical visualizations on the display 1506. The control 1508 can also be configured to include additional functions required for the recording and playback, such as play, stop, pause, record, rewind, fast-forward, save and delete, for example.

Figure 17:
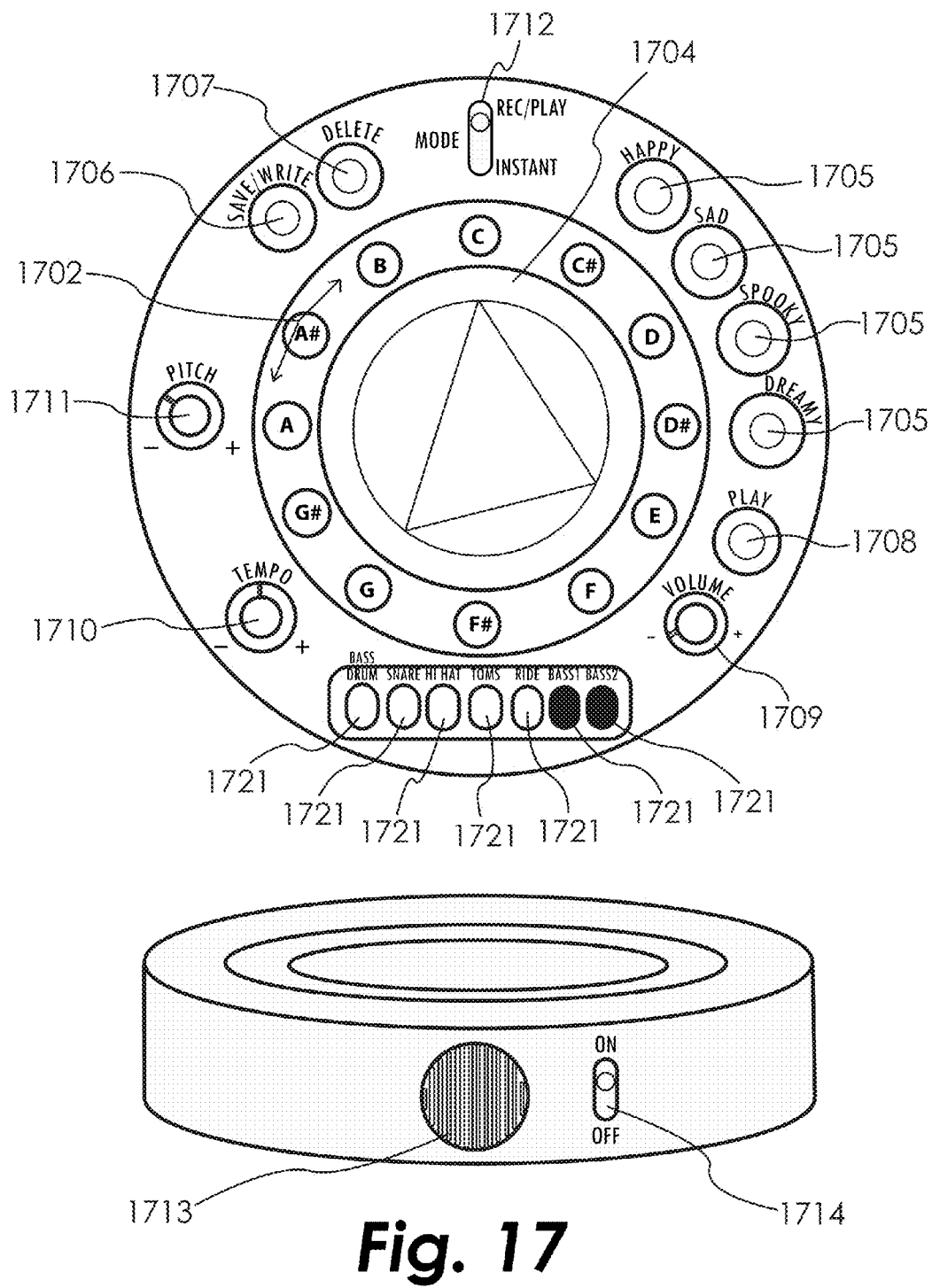
FIG. 17 is a music visualization and composition device using electromechanical note selector buttons according to one embodiment.

Turning to FIG. 17, a child composing device 1700 according to one aspect of the disclosure is shown. The composing device 1700 includes note selector buttons 1702 which correspond to the notes in a musical scale, similar to that shown in previous FIG. 1. The child is able to push various note selector buttons 1702 and instantly see and hear the resulting visualizations and sounds on display 1704 and speaker 1713, respectively. For example, if the child pushes the note selector buttons 1702 for the notes "C" and "F," a line of a designated color will appear on the display 1704 between those two buttons. Pushing three or more buttons simultaneously will result in more complex shapes being displayed, although in certain embodiments this functionality may be selectable by the parent, depending on the age and understanding of the child. In other embodiments, the user is able to enter a record/playback mode using mode switch 1712. In the record/playback mode, the user first presses one or more note selector buttons 1702 to view the resulting lines on display 1704. By pressing the play button 1708, the user is then able to hear the resulting scale or chord sounds. The user can then press the save/write button 1706 to save the chord into memory, or press the delete button 1707 to remove the chord from memory. Successive chord structures can be saved into memory using the save/write button 1706. These saved structures can then be played back in sequence by holding down the play button 1708 for a specified amount of time. Pitch control knob 1711 may also be provided for adjusting the 'center' pitch of the generated tones. Turning pitch control knob 1711 up or down will transpose the entire selected chord or scale, even during playback mode. A mechanical center detent may be provided as part of pitch control knob 1711 to correspond with the labels on note selector buttons 1702.

Other embodiments include additional or alternative mood buttons 1705 which are simply labeled according to the emotional 'mood' of a certain chord shape. For example, pushing buttons labeled 'Happy,' 'Sad,' 'Spooky' and 'Dreamy' will trigger visual displays (and accompanying audio) of a major, minor, diminished, or augmented chord, respectively. This will allow a child of young age to make music, while intuitively becoming aware of more complex musical structures. In addition to textual labels, mood buttons 1705 may be labeled with corresponding graphics which illustrate the designated mood. For example, the 'happy' button may be labeled with a smiley face. The audio and visual outputs triggered by the mood buttons 1705 can also be recorded and played back by the user in the record/playback mode as described above.

In one embodiment, note selector buttons 1702 are implemented as electro-mechanical contactors as shown in FIG. 17. In this embodiment, display 1704 may be implemented as a series of electroluminescent (EL) wires connected between the various note locations. Each EL wire is of a certain color according to a predefined scheme. When deenergized, the EL wires are hidden from view behind a dark panel. When the user selects a certain chord interval or shape using note selector buttons 1702, however, the corresponding EL wires are energized and become visible to the user. Display 1702 may also be implemented as a LCD video screen, in which case the musical visualizations are generated digitally on display 1704.

In other embodiments, as shown in FIG. 18, note selector buttons 1702 are implemented as soft buttons 1802 within display 1704 when display 1704 is implemented as a touch sensitive screen 1804. The user is able activate soft buttons 1802 using stylus 1806. The use of a touch sensitive screen 1804 also allows other functions to be activated using stylus 1802. For example, the play button can be eliminated and the user can instead tap once on the touch sensitive screen 1804 to start playback.

The composing device 1700 may also include a rhythm section 1720. In one embodiment, the user momentarily presses one or more of the rhythm instrument buttons 1721 to commence a predefined continuing rhythm accompaniment which includes the selected instruments. In other embodiments, the user may press the rhythm instrument buttons 1721 repeatedly to engage an accompaniment with the same rhythm as that 'tapped in' by the user. In still further embodiments, the rhythm instrument buttons 1721 may be used to trigger rhythm visualizations on display 1704, similar to those shown in FIG. 13, when display 1704 is implemented as a video screen. Audio and visual information associated with rhythm section 1720 may also be incorporated into the recording and playback functions of the composing device 1700. Tempo control knob can be provided to allow the user to vary the tempo of the rhythm accompaniment or the overall audio and visual playback.

Figure 19:
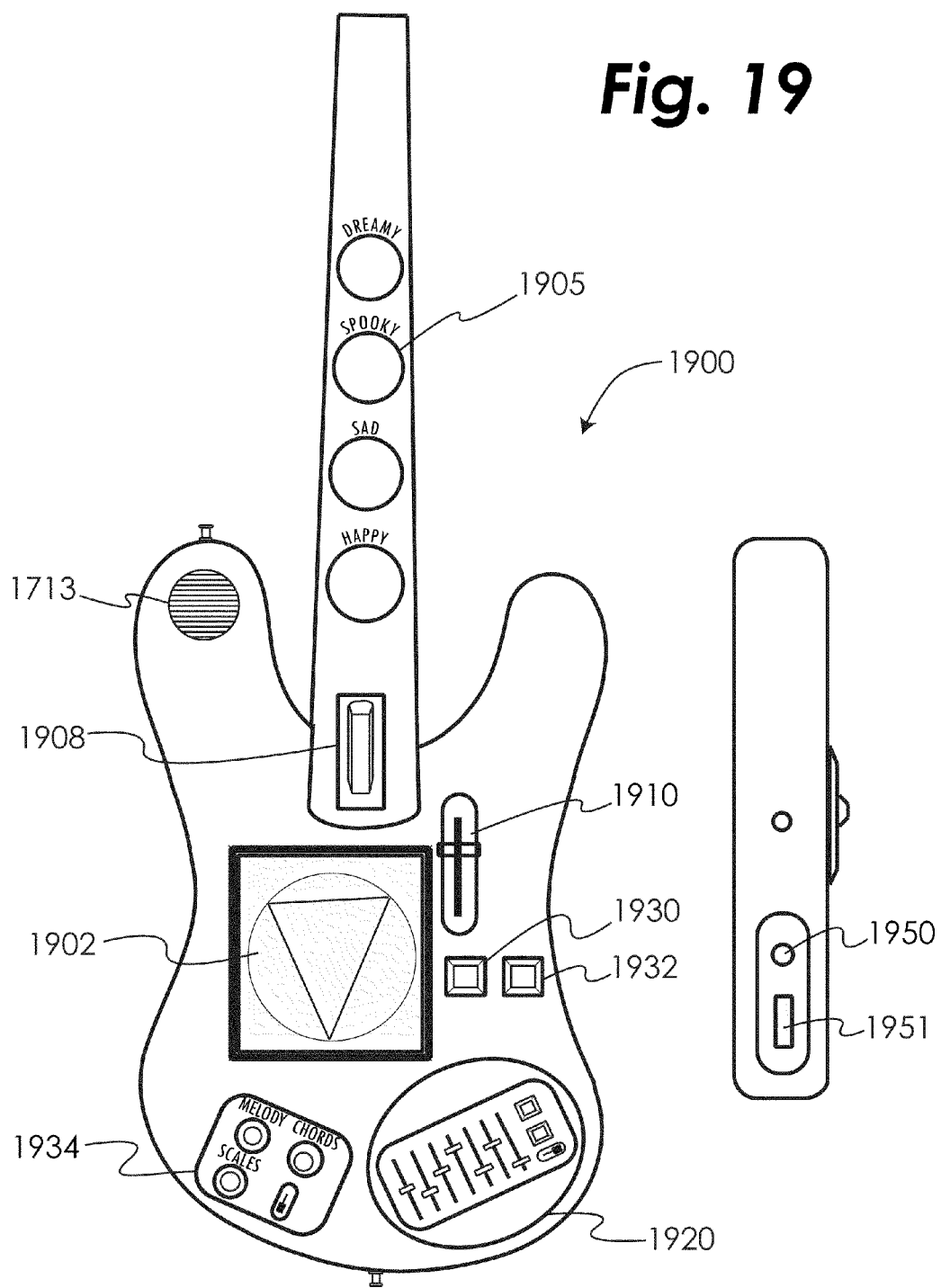
FIG. 19 is a toy guitar according to one embodiment.

FIG. 19 depicts a toy guitar 1900 according to another embodiment of the present disclosure. The user first depresses one of the mood buttons 1905, then depresses the play trigger 1908 to hear the resulting chord or scale through speaker 1713. Corresponding visualizations are displayed to the user on display 1902. Tempo slider 1910 can also be provided for tempo control. As described above, a rhythm section 1920 can be provided as well. View selector button 1930 can optionally be provided which allows the user to select between two or three dimensional visualizations. Additionally, button 1932 can be provided which allows the user to select between tonal and rhythmic visualizations. A format selector 1934 provides the user with the ability to switch between chords, melodies and scales. For example, when the user selects 'chords' in format selector 1934, the user will hear a simultaneous chord after pressing a mood button 1905 and play trigger 1908. Likewise, when the user selects 'scales,' a corresponding linear scale is heard. The 'melody' option results in a predefined melody which utilizes a 'mood' corresponding to the selected mood button 1905 (such as a melody in a major key for the 'happy' button). Toy guitar 1900 may also include analog audio jack 1950 and digital jack 1951 for connection to other peripheral devices, such as external displays or other instruments. Digital jack 1951 may comprise a USB, Firewire, Ethernet, or other data bus connection known in the art.

Figure 20:
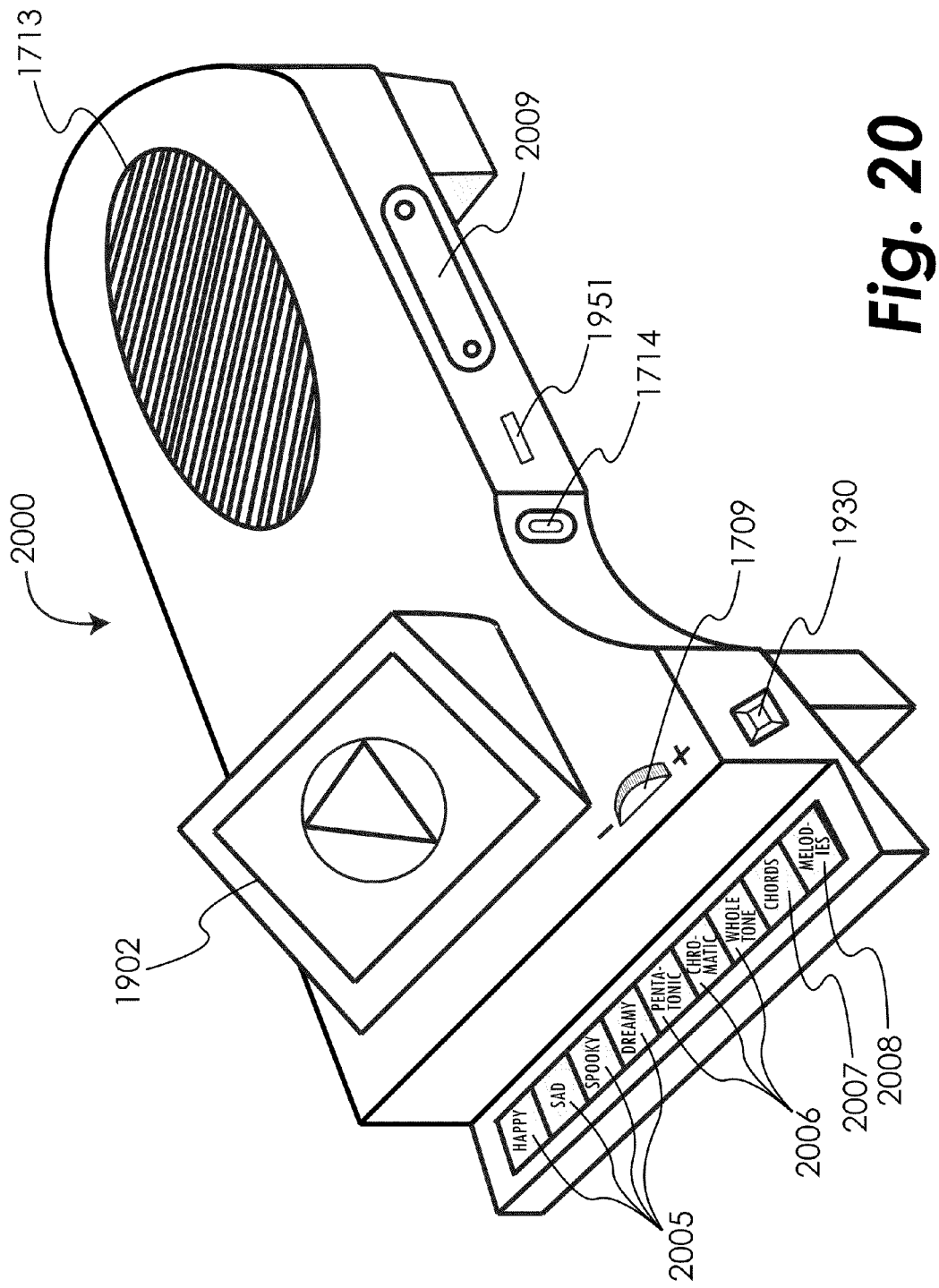
FIG. 20 is a toy piano according to one embodiment.

FIG. 20 shows a toy piano 2000 according to yet another embodiment of the present disclosure. Like the toy guitar 1900, the user can press mood buttons 2005 to hear and see the resulting audio and visual information via speaker 1713 and display 1902 respectively. Toy piano 2000 may optionally include scale buttons 2006 which, when pressed, will result in a pentatonic, chromatic, or whole tone based chord or melody output from speaker 1713, depending on which scale button 2006 was pressed. Chord button 2007 and melodies button 2008 may also be optionally provided for selecting the format of the output music. For example, when chord button 2007 is engaged, the user will hear major chord after pressing the 'Happy' mood button 2005. When melodies button 2008 is engaged, the user will consecutively hear the individual tones of a major scale. Chord button 2007 and melodies button 2008 may be configured to operate as exclusive alternative switch poles. In other words, engaging chord button 2007 may cause melodies button 2008 to disengage and vice versa. Toy piano 2000 may also optionally include view selector button 1930, volume control 1709, power switch 1714, digital jack 1951, and battery compartment 2009.

Figure 21:
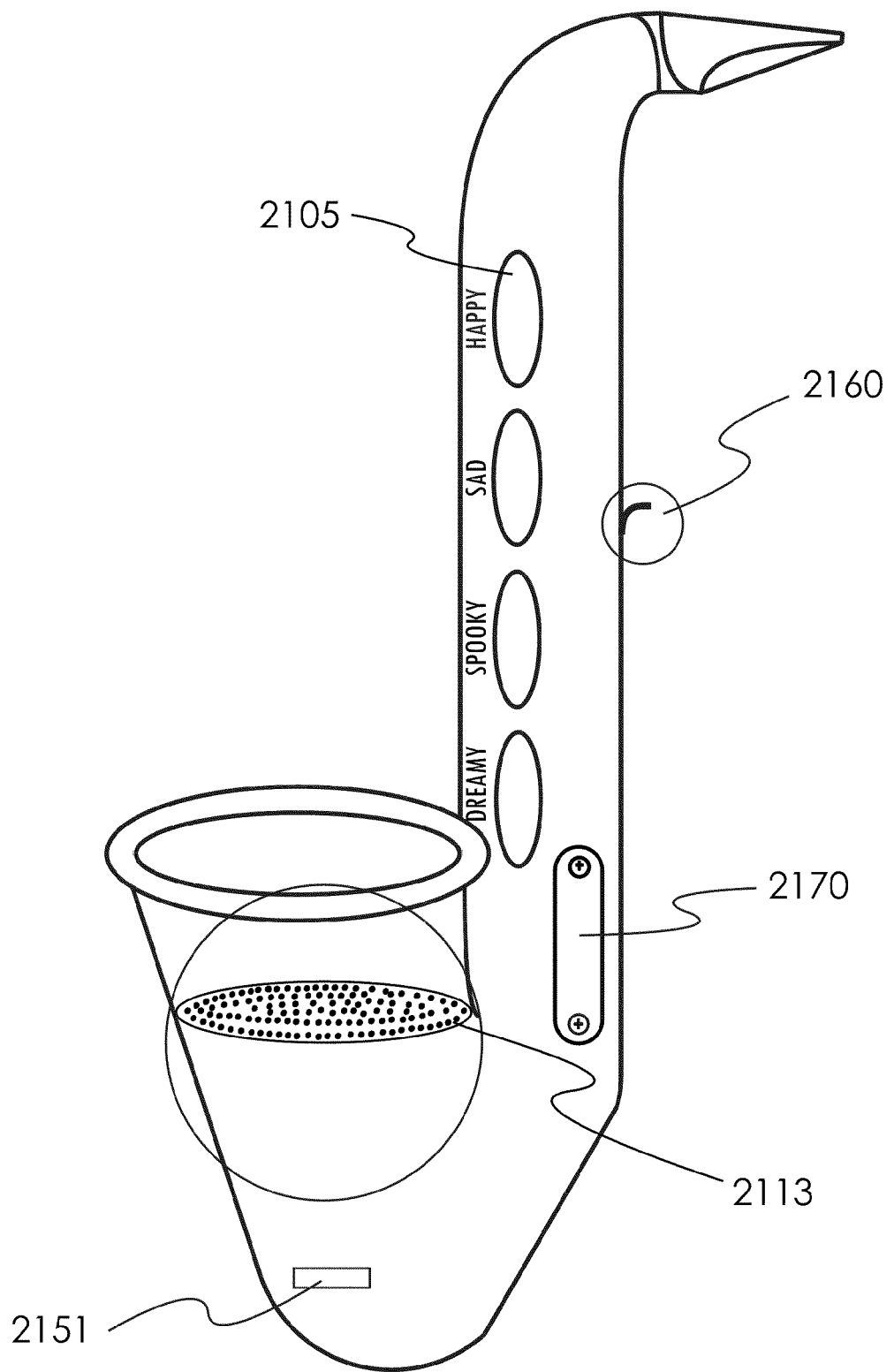
FIG. 21 is a toy saxophone according to one embodiment.

FIG. 21 shows a toy saxophone 2100 according to yet another embodiment of the present disclosure. Again, mood buttons 2105 are provided, along with speaker 2113, digital jack 2151, thumb rest 2160, and battery compartment 2170. It shall be understood that the disclosed method can be implemented in a variety of other toy instruments, such as woodwinds, horns, xylophones, drums, and virtually any other musical instrument.

Figure 22:
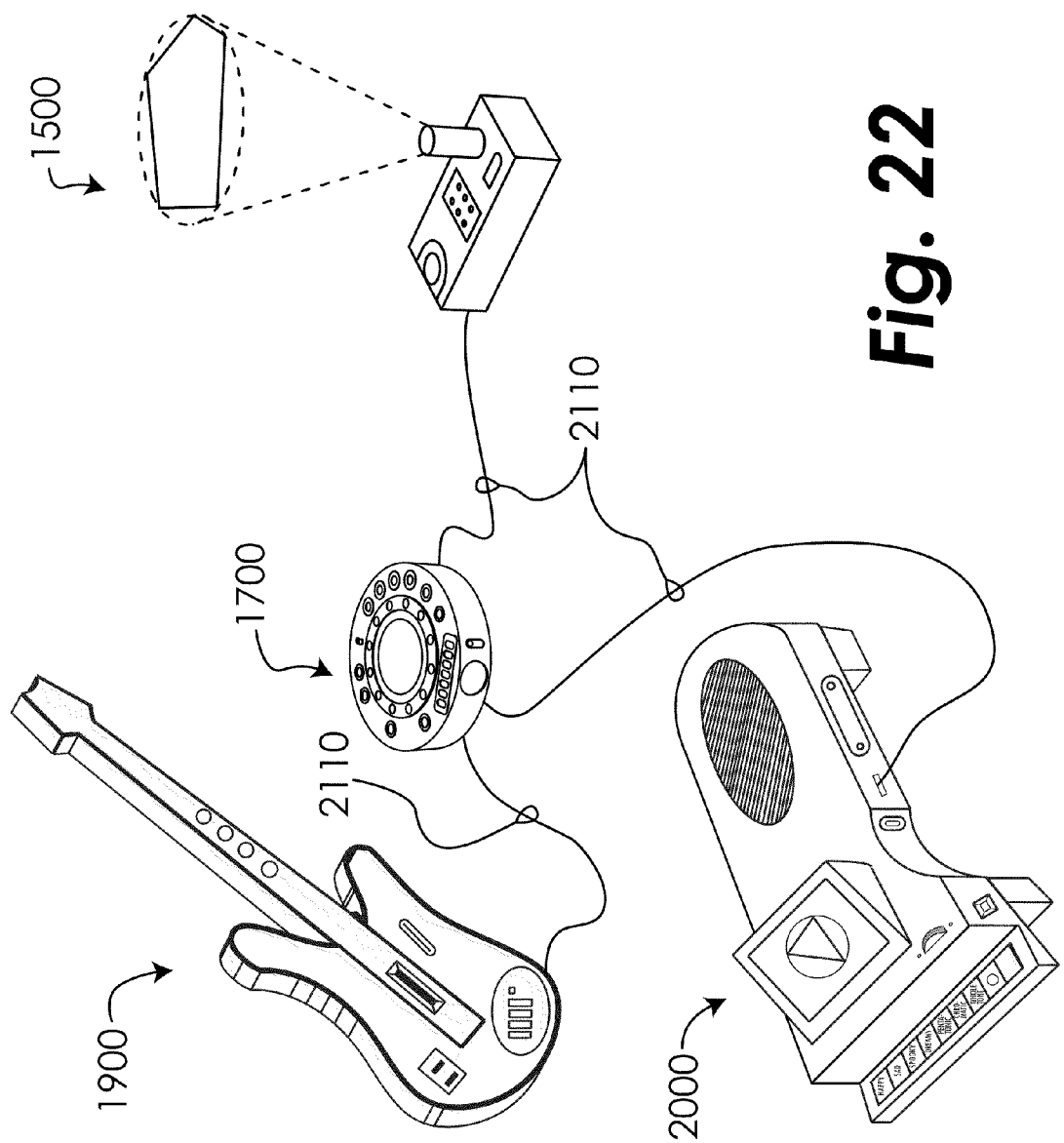
FIG. 22 is a diagram showing various music education devices connected as a kit according to one embodiment.

As shown in FIG. 22, the disclosed music education devices may be implemented as a kit, with various elements being interconnected in any combination using a wired data bus 2210, such as USB, Firewire, Ethernet, or other data bus connection known in the art. For example, guitar 1900 is shown connected to composing device 1700, which is further connected to projector 1612. Other instruments, such as piano 2000 can also be connected to composing device 1700, or even connected directly to projector 1612 if no composing device 1700 is used. In other embodiments, the various elements may communicate using non-wired methods, such as infrared, Bluetooth, or other wireless methods known in the art. The instruments may output analog audio or digital (e.g. MIDI compliant) messages to the processing devices for use in visualization.

In certain embodiments, the instruments (guitar 1900 and piano 2000 for example) do not contain the visualization processing unit 1504 in order to lower manufacturing costs, with the visualization processing being done by the composing device 1700. The various components can also be provided with or without display screens, depending on the needs of the user. For example, less expensive kits may include a guitar 1900 (without a display 1902) and a composing device 1700. This configuration still allows the user to play the guitar while viewing the visualizations on composing device 1700. More expensive kits may include a projector 1612, enabling the user to play the guitar and simultaneously view a much larger display. In certain situations, such as teaching, users may choose to make compositions using only composing device 1700, and later playback the music along with visualizations on projector 1612.

In further embodiments, users are able to compose music on composing device 1700 and later initiate playback by pressing certain keys on the individual instruments. This accommodates users who wish to create and arrange compositions from a more theory-based viewpoint on the composing device 1700, while still being able to play back their compositions with the feel and sound of a traditional instrument. For example, the user may compose music on the composing device 1700 with no particular relation to a specific instrument, then press buttons on the guitar 1900 to hear the composition played back in the sound of a guitar. Even further embodiments may allow the user to press keys on one instrument and trigger other instruments to play the same notes or a group of related notes. For example, when the user presses the 'sad' button on the piano 2000, invoking a minor chord or scale, the guitar 1900 may also sound a minor chord or group of notes in the same minor scale.

As described, certain components in the kit can also be made to be upgradeable or configured to accept electronic modules or programs. For example, replaceable modules may be provided which provide varying degrees of musical complexity depending on the age and understanding of the user. This will enable each component to be used for many years as a teaching tool and entertainment device.

What is claimed:

1. A child music education device comprising:
   (a) an input sound source;
   (b) a control unit;
   (c) a processing unit operatively coupled to said control unit; and
   (d) a display operatively coupled to said processing unit, wherein:
      said processing unit is capable of creating a visual representation of said input sound source for output on said display; and
   wherein:
      said visual representation is generated according to a method comprising the steps of:
      (a) placing twelve labels in a pattern of a circle, said twelve labels corresponding to twelve respective notes in an octave, such that moving clockwise or counter-clockwise between adjacent ones of said labels represents a musical half-step;
      b) identifying an occurrence of a first one of the twelve notes;
      c) identifying an occurrence of a second one of the twelve notes;
      (d) identifying a first label corresponding to the first note;
      (e) identifying a second label corresponding to the second note;
      (f) creating a first line connecting the first label and the second label, wherein:
         (1) the first line is a first color if the first note and the second note are separated by a half step;
         (2) the first line is a second color if the first note and the second note are separated by a whole step;
         (3) the first line is a third color if the first note and the second note are separated by a minor third;
         (4) the first line is a fourth color if the first note and the second note are separated by a major third;
         (5) the first line is a fifth color if the first note and the second note are separated by a perfect fourth; and
         (6) the first line is a sixth color if the first note and the second note are separated by a tri-tone; and
   wherein said display comprises a projector for projecting said visualizations.

2. The device of claim 1, wherein said projector is capable of projecting holographic images.

3. A child music education device comprising:
   (a) an input sound source;
   (b) a control unit;
   (c) a processing unit operatively coupled to said control unit; and
   (d) a display operatively coupled to said processing unit, wherein:
      said processing unit is capable of creating a visual representation of said input sound source for output on said display; and
   wherein:

said visual representation is generated according to a method comprising the steps of:
(a) placing twelve labels in a pattern of a circle, said twelve labels corresponding to twelve respective notes in an octave, such that moving clockwise or counter-clockwise between adjacent ones of said labels represents a musical half-step;
(b) identifying an occurrence of a first one of the twelve notes;
(c) identifying an occurrence of a second one of the twelve notes;
(d) identifying a first label corresponding to the first note;
(e) identifying a second label corresponding to the second note;
(f) creating a first line connecting the first label and the second label, wherein:
(1) the first line is a first color if the first note and the second note are separated by a half step;
(2) the first line is a second color if the first note and the second note are separated by a whole step;
(3) the first line is a third color if the first note and the second note are separated by a minor third;
(4) the first line is a fourth color if the first note and the second note are separated by a major third;
(5) the first line is a fifth color if the first note and the second note are separated by a perfect fourth; and
(6) the first line is a sixth color if the first note and the second note are separated by a tri-tone; and
a means for attaching said child music education device to a child's crib.

4. A child music education device comprising:
(a) an input sound source;
(b) a control unit;
(c) a processing unit operatively coupled to said control unit; and
(d) a display operatively coupled to said processing unit, wherein:
said processing unit is capable of creating a visual representation of said input sound source for output on said display; and
wherein:
said visual representation is generated according to a method comprising the steps of:
(a) placing twelve labels in a pattern of a circle, said twelve labels corresponding to twelve respective notes in an octave, such that moving clockwise or counter-clockwise between adjacent ones of said labels represents a musical half-step;
(b) identifying an occurrence of a first one of the twelve notes;
(c) identifying an occurrence of a second one of the twelve notes;
(d) identifying a first label corresponding to the first note;
(e) identifying a second label corresponding to the second note;
(f) creating a first line connecting the first label and the second label, wherein:
(1) the first line is a first color if the first note and the second note are separated by a half step;
(2) the first line is a second color if the first note and the second note are separated by a whole step;
(3) the first line is a third color if the first note and the second note are separated by a minor third;
(4) the first line is a fourth color if the first note and the second note are separated by a major third;
(5) the first line is a fifth color if the first note and the second note are separated by a perfect fourth; and
(6) the first line is a sixth color if the first note and the second note are separated by a tri-tone; and
wherein said child music education device is in the shape of a guitar.

5. A child music education device comprising:
(a) an input sound source;
(b) a control unit;
(c) a processing unit operatively coupled to said control unit; and
(d) a display operatively coupled to said processing unit, wherein:
said processing unit is capable of creating a visual representation of said input sound source for output on said display; and
wherein:
said visual representation is generated according to a method comprising the steps of:
(a) placing twelve labels in a pattern of a circle, said twelve labels corresponding to twelve respective notes in an octave, such that moving clockwise or counter-clockwise between adjacent ones of said labels represents a musical half-step;
(b) identifying an occurrence of a first one of the twelve notes;
(c) identifying an occurrence of a second one of the twelve notes;
(d) identifying a first label corresponding to the first note;
(e) identifying a second label corresponding to the second note;
(f) creating a first line connecting the first label and the second label, wherein:
(1) the first line is a first color if the first note and the second note are separated by a half step;
(2) the first line is a second color if the first note and the second note are separated by a whole step;
(3) the first line is a third color if the first note and the second note are separated by a minor third;
(4) the first line is a fourth color if the first note and the second note are separated by a major third;
(5) the first line is a fifth color if the first note and the second note are separated by a perfect fourth; and
(6) the first line is a sixth color if the first note and the second note are separated by a tri-tone; and
wherein said child music education device is in the shape of a piano.

6. A child music education device comprising:
(a) an input sound source;
(b) a control unit;
(c) a processing unit operatively coupled to said control unit; and
(d) a display operatively coupled to said processing unit, wherein:
said processing unit is capable of creating a visual representation of said input sound source for output on said display; and
wherein:
said visual representation is generated according to a method comprising the steps of:
(a) placing twelve labels in a pattern of a circle, said twelve labels corresponding to twelve respective notes in an octave, such that moving clockwise or counter-clockwise between adjacent ones of said labels represents a musical half-step;

(b) identifying an occurrence of a first one of the twelve notes;
(c) identifying an occurrence of a second one of the twelve notes;
(d) identifying a first label corresponding to the first note;
(e) identifying a second label corresponding to the second note;
(f) creating a first line connecting the first label and the second label, wherein:
  (1) the first line is a first color if the first note and the second note are separated by a half step;
  (2) the first line is a second color if the first note and the second note are separated by a whole step;
  (3) the first line is a third color if the first note and the second note are separated by a minor third;
  (4) the first line is a fourth color if the first note and the second note are separated by a major third;
  (5) the first line is a fifth color if the first note and the second note are separated by a perfect fourth; and
  (6) the first line is a sixth color if the first note and the second note are separated by a tri-tone; and
wherein said control unit comprises a plurality of note selector buttons which correspond to musical notes, and wherein said note selector buttons trigger the output of said visual representation on said display.

7. The device of claim 6, wherein said note selector buttons are arranged in a circular fashion around said display.

8. The device of claim 6, wherein said note selector buttons are implemented as electromechanical switches.

9. The device of claim 6, wherein said display comprises a touch sensitive screen and said note selector buttons are implemented as software buttons within said display.

10. A child music education device comprising:
(a) an input sound source;
(b) a control unit;
(c) a processing unit operatively coupled to said control unit; and
(d) a display operatively coupled to said processing unit, wherein:
  said processing unit is capable of creating a visual representation of said input sound source for output on said display; and
wherein:
  said visual representation is generated according to a method comprising the steps of:
  (a) placing twelve labels in a pattern of a circle, said twelve labels corresponding to twelve respective notes in an octave, such that moving clockwise or counter-clockwise between adjacent ones of said labels represents a musical half-step;
  (b) identifying an occurrence of a first one of the twelve notes;
  (c) identifying an occurrence of a second one of the twelve notes;
  (d) identifying a first label corresponding to the first note;
  (e) identifying a second label corresponding to the second note;
  (f) creating a first line connecting the first label and the second label, wherein:
    (1) the first line is a first color if the first note and the second note are separated by a half step;
    (2) the first line is a second color if the first note and the second note are separated by a whole step;
    (3) the first line is a third color if the first note and the second note are separated by a minor third;
    (4) the first line is a fourth color if the first note and the second note are separated by a major third;
    (5) the first line is a fifth color if the first note and the second note are separated by a perfect fourth; and
    (6) the first line is a sixth color if the first note and the second note are separated by a tri-tone; and
  wherein the device is operable to allow the user to record compositions and play back recorded compositions.

11. A child music education device comprising:
(a) an input sound source;
(b) a control unit;
(c) a processing unit operatively coupled to said control unit; and
(d) a display operatively coupled to said processing unit, wherein:
  said processing unit is capable of creating a visual representation of said input sound source for output on said display; and
wherein:
  said visual representation is generated according to a method comprising the steps of:
  (a) placing twelve labels in a pattern of a circle, said twelve labels corresponding to twelve respective notes in an octave, such that moving clockwise or counter-clockwise between adjacent ones of said labels represents a musical half-step;
  (b) identifying an occurrence of a first one of the twelve notes;
  (c) identifying an occurrence of a second one of the twelve notes;
  (d) identifying a first label corresponding to the first note;
  (e) identifying a second label corresponding to the second note;
  (f) creating a first line connecting the first label and the second label, wherein:
    (1) the first line is a first color if the first note and the second note are separated by a half step;
    (2) the first line is a second color if the first note and the second note are separated by a whole step;
    (3) the first line is a third color if the first note and the second note are separated by a minor third;
    (4) the first line is a fourth color if the first note and the second note are separated by a major third;
    (5) the first line is a fifth color if the first note and the second note are separated by a perfect fourth; and
    (6) the first line is a sixth color if the first note and the second note are separated by a tri-tone; and
wherein said first line is made viewable to a user by energizing an electroluminescent wire.

\* \* \* \* \*